United States Patent
Sung et al.

(10) Patent No.: US 10,231,196 B2
(45) Date of Patent: Mar. 12, 2019

(54) COMMUNICATION APPARATUS AND METHOD USING RANDOM ACCESS PROCEDURE

(71) Applicant: KOREA ADVANCED INSTITUTE OF SCIENCE AND TECHNOLOGY, Daejeon (KR)

(72) Inventors: Dan Keun Sung, Daejeon (KR); Han Seung Jang, Daejeon (KR); Su Min Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 72 days.

(21) Appl. No.: 15/502,857

(22) PCT Filed: Feb. 23, 2016

(86) PCT No.: PCT/KR2016/001728
§ 371 (c)(1),
(2) Date: Feb. 9, 2017

(87) PCT Pub. No.: WO2016/163642
PCT Pub. Date: Oct. 13, 2016

(65) Prior Publication Data
US 2017/0231012 A1 Aug. 10, 2017

(30) Foreign Application Priority Data

Apr. 10, 2015 (KR) .................. 10-2015-0050842
Sep. 16, 2015 (KR) .................. 10-2015-0130823
Feb. 22, 2016 (KR) .................. 10-2016-0020391

(51) Int. Cl.
*H04W 74/08* (2009.01)
*H04W 52/60* (2009.01)
(Continued)

(52) U.S. Cl.
CPC ............. *H04W 52/60* (2013.01); *H04L 25/00* (2013.01); *H04W 52/146* (2013.01);
(Continued)

(58) Field of Classification Search
CPC ........... H04W 74/0858; H04W 52/146; H04W 52/60; H04L 69/28; H04J 13/0062
(Continued)

(56) References Cited

U.S. PATENT DOCUMENTS 8,077,593 B2 * 12/2011 Iwai .................. H04L 5/0007
370/204
8,140,083 B2 * 3/2012 Fischer .............. H04L 1/0028
455/450
(Continued)

FOREIGN PATENT DOCUMENTS

KR       10-0704068       4/2007
KR    10-2008-0013649    2/2008
(Continued)

OTHER PUBLICATIONS

International Search Report for PCT/KR2016/001728, dated Jun. 2, 2016, 8 pages.
(Continued)

*Primary Examiner* — Man U Phan
(74) *Attorney, Agent, or Firm* — Nixon & Vanderhye P.C.

(57) ABSTRACT

User equipment (UE) that includes a processor and that executes a random access procedure with a base station (E-UTRAN Node B (eNodeB), also known as Evolved Node B) is provided. The UE can at least temporarily be embodied by the processor. The UE may comprise: a determination unit for determining a message size that can be transmitted and that corresponds to a physical random access channel according to an assigned communication method with the base station; a calculation unit for config-
(Continued)

uring a message to correspond to the message size and for respectively calculating a preamble index and at least one message index from the message; and an encoder for providing respective encoding of the preamble index and the at least one message index, and transmitting the same to the base station.

14 Claims, 21 Drawing Sheets

(51) Int. Cl.
*H04W 52/14* (2009.01)
*H04L 25/00* (2006.01)
*H04J 13/00* (2011.01)
*H04W 52/16* (2009.01)

(52) U.S. Cl.
CPC ..... *H04W 74/0833* (2013.01); *H04J 13/0062* (2013.01); *H04W 52/16* (2013.01)

(58) Field of Classification Search
USPC .................................................. 370/329–352
See application file for complete search history.

(56) References Cited

U.S. PATENT DOCUMENTS

| 8,199,778 | B2 * | 6/2012 | Shimomura | ........ H04W 74/004 |
| | | | | 370/328 |
| 8,218,496 | B2 * | 7/2012 | Bertrand | ............. H04L 27/2633 |
| | | | | 370/329 |
| 8,634,288 | B2 * | 1/2014 | McGowan | ............ H04L 27/265 |
| | | | | 370/210 |
| 8,792,377 | B2 * | 7/2014 | Bertrand | ............... H04L 1/0007 |
| | | | | 370/252 |
| 9,357,564 | B2 * | 5/2016 | Bertrand | ............. H04W 74/004 |
| 9,629,165 | B2 * | 4/2017 | Bertrand | ............... H04L 1/0007 |
| 9,781,747 | B2 * | 10/2017 | Kim | .................. H04W 74/0833 |
| 9,814,066 | B2 * | 11/2017 | Bertrand | ............. H04W 74/004 |

FOREIGN PATENT DOCUMENTS

| KR | 10-2010-0032266 | 3/2010 |
| KR | 10-1033689 | 5/2011 |
| WO | WO 2015-137632 | 9/2015 |

OTHER PUBLICATIONS

Written Opinion of the ISA for PCT/KR2016/001728, dated Jun. 2, 2016, 10 pages.
Jang, "Spatial Group based Random Access for M2M Communications", Master's Thesis, Kaist, Electricity and Electronic Engineering, Dec. 20, 2013, pp. 1-58.
KR language Office Action for KR 10-2015-0130823, dated Mar. 2, 2016, 4 pages.
Master's Thesis Spatial Group Based Random Access for M2M Communications, KAIST, 2014; JANG (English Abstract included in p. 5).

* cited by examiner

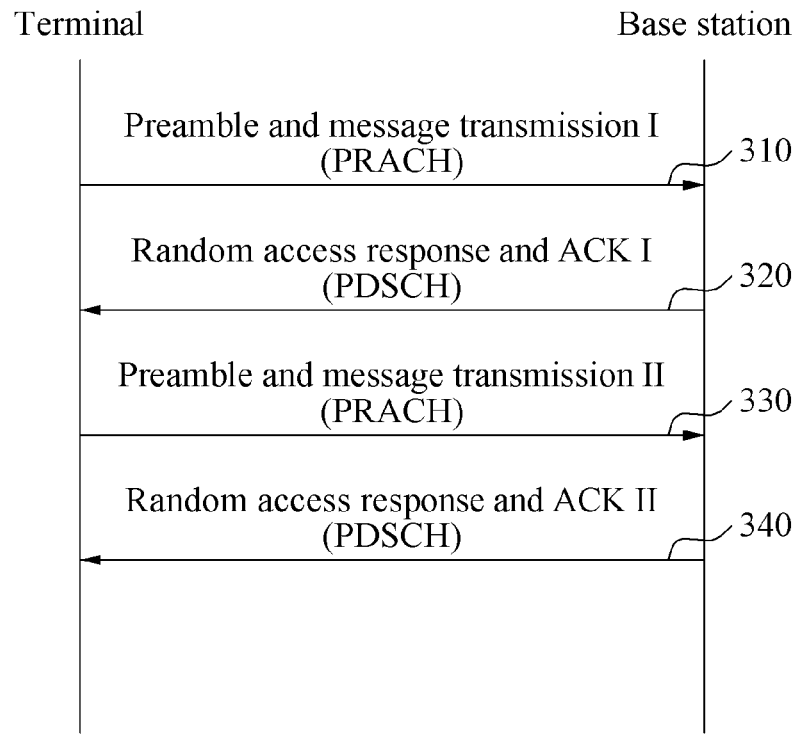
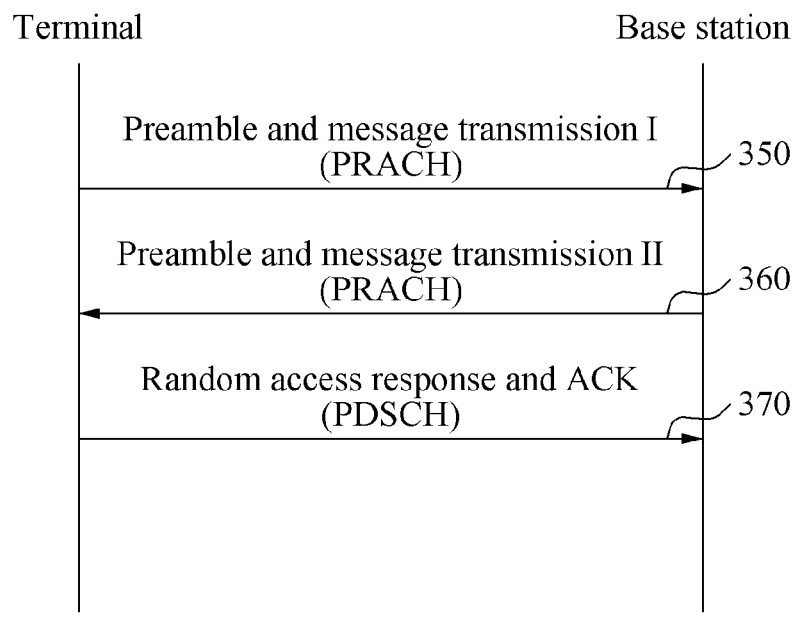

FIG. 7

| | |
|---|---|
| 0 | ⎫ |
| 0 | ⎬ 730 |
| 0 | |
| 1 | |
| 1 | |
| 0 | ⎭ |
| 1 | ⎫ |
| 1 | |
| 1 | |
| 0 | |
| 0 | |
| 0 | ⎬ 720 |
| 1 | |
| 1 | |
| 0 | |
| 0 | ⎭ |
| 0 | ⎫ |
| 0 | |
| 1 | |
| 0 | ⎬ 710 |
| 0 | |
| 0 | |
| 1 | |
| 0 | ⎭ |

COMMUNICATION APPARATUS AND METHOD USING RANDOM ACCESS PROCEDURE

This application is the U.S. national phase of International Application No. PCT/KR2016/001728 filed 23 Feb. 2016, which designated the U.S. and claims priority to KR Patent Application Nos. 10-2015-0050842 filed 10 Apr. 2015, 10-2015-0130823 filed 16 Sep. 2015, and 10-2016-0020391 filed 22 Feb. 2016, the entire contents of each of which are hereby incorporated by reference.

TECHNICAL FIELD

Example embodiments relate to a communication method between terminals performing wireless communication and/or between a terminal and a base station, and more particularly, to a communication method of devices that perform a random access process for communication.

RELATED ART

With the fast developments of Information and Communications Technologies (ICT), the hyper-connected society will be open in the near future. The hyper-connected society is known as a society in which all of objects including persons, processes, data, things, etc., are connected to a network. A key structure of this technology is machine-to-machine (M2M) communication or Internet of Things (IoT).

In the hyper-connected society, a number of independent devices performing communication will geometrically increase. According to data of Cisco Corporation, things (machines, communication equipment, terminals, etc.) connected to the Internet will increase from about 10 billion in 2013 to about 50 billion in 2020 and all of the entities (person, processes, data, things, etc.) will be connected to the Internet, that is, will become Internet of Everything (IoE). With the rapid expansion of IoT infrastructure, a significantly large number of nodes may perform wireless access. Accordingly, a wireless access collision or an insufficient wireless resource issue coming from processing a wireless resource request needs to be solved.

Meanwhile, to save energy, a cellular communication method among communication methods according to the related art maintains a connection with a network in a disconnected state except for a message transmission case and initiates communication through random access when communication with the network is required. As described above, in the hyper-connected society, in many cases, communication nodes may transmit a relative small size of data, such as a device state message, sensing data, and smart metering data. In this case, if communication is performed by performing the random access process as in the related art and assigning a separate resource after the random access, communication overhead over a small amount of data transmission may be great.

DETAILED DESCRIPTION

Solution

Various aspects and example embodiments of a data transmission method through a random access process and an apparatus for performing the method are proposed. In detail, a new random access process may be performed together with and/or instead of the conventional random access method. Devices may further efficiently transmit data during the above process. Some aspects, which are not limited, will be described as an example.

According to an aspect, there is provided a terminal, for example, user equipment (UE), including a processor and that performs a random access procedure with a base station, for example, eNodeB, E-UTRAN Node B, or also known as Evolved Node B. The terminal may be at least temporarily embodied by the processor. The terminal may include a determiner configured to determine a transmittable message size corresponding to a physical random access channel based on a predetermined communication scheme with the base station; a calculator configured to set a message to correspond to the message size, and to calculate each of a preamble index and at least one message index from the message; and an encoder configured to encode each of the preamble index and the at least one message index, and to transmit the same to the base station.

According to an example embodiment, the determiner may be configured to determine the transmittable message size based on a Zadoff-Chu sequence length corresponding to the predetermined communication scheme, the number of preamble sequences, and the number of message root index functions. In addition, when transmitting a message increased to be greater than a Zadoff-Chu sequence length corresponding to the predetermined communication scheme, the determiner may be configured to transmit the increased message using a plurality of subframes corresponding to the physical random access channel.

According to another example embodiment, the calculator may be configured to calculate at least one message root index different from a preamble root index using each of at least one message root index function that uses the preamble index as an independent variable. According to another example embodiment, the calculator may be configured to iteratively extract at least one message bitstream corresponding to each of the at least one message index from a start bit of the set message, and to extract a preamble bitstream from the remaining message.

According to another example embodiment, the encoder may be configured to generate each of a preamble sequence acquired by cyclically shifting a Zadoff-Chu sequence corresponding to a preamble root index by a constant value corresponding to the preamble index and a message sequence acquired by cyclically shifting a Zadoff-Chu sequence corresponding to each of the at least one message root index by a sum of the constant value corresponding to the preamble index and each of the at least one message index, and to transmit the generated preamble sequence and message sequence to the base station.

According to example embodiment, the terminal may further include a selector configured to select one of a preamble transmission mode and a simultaneous message transmission mode. When the selector selects the preamble transmission mode, the encoder may be configured to encode the preamble index and to transmit the encoded preamble index to the base station.

According to another aspect, there is provided a terminal that recognizes a preamble collision and perform back-off in a second step of random access. The terminal may include a determiner configured to determine whether a random access response message corresponding to a transmitted sequence is received; and a controller configured to perform back-off corresponding to a preset time interval when it is determined that the random access response message is not received.

According to an example embodiment, the controller may be configured to transmit an additional message to the base station using an uplink resource included in the random access response message when it is determined that the random access response message is received.

According to another aspect, there is provided a base station including a processor and that performs a random access procedure with a terminal. The base station may be temporarily embodied by the processor. The base station may determine whether a preamble collision is present in a first step of random access using a correlation value of a message index associated with a preamble.

The base station may include a calculator configured to calculate a received preamble index using a sequence received from the terminal and a Zadoff-Chu sequence associated with a preamble; and a determiner configured to determine whether a preamble collision is present using a Zadoff-Chu sequence associated with a message root index that is determined based on the preamble index. The determiner may be configured to calculate a correlation value between the received sequence and the Zadoff-Chu sequence associated with the message root index, and to determine that the preamble collision is present when at least two peaks of the correlation value exceed a preset threshold.

According to an example embodiment, the base station may further include a decoder configured to decode a message transmitted from the terminal through the random access procedure using the preamble index and a message index. When it is determined that the preamble collision is absent, the calculator may be configured to calculate the message index using the received sequence and the Zadoff-Chu sequence associated with the message root index.

According to another aspect, there is provided a base station that configures connectionless data transmission and reception with a terminal by simultaneously detecting a preamble index and a message index. The base station may include a calculator configured to calculate a correlation value corresponding to a preamble index and a correlation value corresponding to each of at least one message index using a sequence received from the terminal; and a detector configured to detect each of the preamble index and the at least one message index based on the correlation value corresponding to the preamble index and the correlation value corresponding to each of the at least one message index.

According to an example embodiment, the calculator may be configured to calculate at least one message root index that is determined based on the preamble index using at least one message index function, and to calculate the correlation value corresponding to each of the at least one message index using a Zadoff-Chu sequence corresponding to the at least one message root index.

According to another example embodiment, the detector may be configured to detect each of the at least one message index by comparing a location number corresponding to a peak of the correlation value corresponding to the preamble index to a location number corresponding to a peak of the correlation value corresponding to each of the at least one message index.

According to another example embodiment, the base station may further include a decoder configured to decode a message transmitted from the terminal through the random access procedure using the at least one message index and the preamble index. The decoder may be configured to identify a predetermined prefix bit from the decoded message, and to determine an operation mode of the terminal based on the prefix bit. Also, the decoder may be configured to determine, as the operation mode of the terminal, at least one of a first mode for transmitting a subsequent message using a random access resource, a second mode for transmitting the message through a unit frame and terminating the transmission, and a third mode for transmitting the subsequent message through an additional frame. In detail, when the operation mode is the first mode, the decoded message may include a scheduling request that includes resource block size information used to transmit the subsequent message. Meanwhile, when the operation mode is the third mode, the decoder may be configured to determine the message as a portion of the entire message transmitted from the terminal and to merge a subsequent message decoded from the additional frame.

According to another aspect, there is provided a method of controlling access load at a base station that performs a random access procedure with a plurality of terminals. The method may include detecting at least one message index corresponding to each preamble index from a plurality of received sequences; calculating access load corresponding to the number of the detected at least one message index; and controlling an access period of a physical random access channel based on a result of comparing the access load and a preset threshold.

According to an example embodiment, the controlling of the access period may include setting $T_{RACH}$ corresponding to the access period to further increase if the access load is less than the threshold, and setting $T_{RACH}$ corresponding to the access period to further decrease if the access load is greater than the threshold.

According to another aspect, there is provided a terminal, for example, user equipment (UE), that performs random access with a base station, for example, eNodeB, E-UTRAN Node B, or also known as Evolved Node B. Herein, the terminal may be configured in various types, such as a laptop computer that performs communication with an external device using a communication interface, a mobile phone, a smartphone, a tablet personal computer (PC), a mobile Internet device (MID), a personal digital assistant (PDA), an enterprise digital assistant (EDA), a handheld console, an e-book, and a smart device. The terminal may include at least one processor and may be at least temporarily embodied by the at least one processor. The terminal may include a determiner configured to determine whether a preamble transmitted from the terminal and timing alignment information associated with the terminal are included in a received random access response message; and a controller configured to control transmission power of data transmitted through an uplink resource grant included in the random access response message, based on a result of the determining.

According to an example embodiment, when it is determined that the preamble and the timing alignment information are included in the random access response message, the controller may be configured to transmit the data using predetermined reference power.

According to another example embodiment, when it is determined that the preamble is included in the random access response message and the timing alignment information is not included in the random access response message, the controller may be configured to transmit the data using power changed by a predetermined magnitude compared to the predetermined reference power. In detail, the controller may be configured to transmit the data using the power changed by increasing or decreasing the predetermined reference power by the predetermined magnitude.

According to another aspect, there is provided a terminal to control transmission power based on the number of other terminals using the same uplink resource. The terminal may include a determiner configured to determine the number of random access response messages each including the same uplink resource as an uplink resource associated with the terminal; and a controller configured to control transmission power of data transmitted through the uplink resource based on a result of the determining.

According to an example embodiment, the uplink resource associated with the terminal may be included in a random access response message that includes a preamble transmitted from the terminal and timing alignment information associated with the terminal.

According to another example embodiment, when it is determined that a single random access response message that includes the uplink resource associated with the terminal is received, the controller may be configured to transmit the data using predetermined reference power.

According to another example embodiment, when it is determined that a plurality of random access response messages each including the uplink resource associated with the terminal is received, the determiner may be configured to compare timing alignment information included in each of the plurality of random access response messages and timing alignment information associated with the terminal. In addition, the controller may be configured to transmit the data using power changed by a predetermined magnitude compared to the predetermined reference power based on a result of the determining. In detail, the controller may be configured to calculate the number of pieces of timing alignment information having a value greater than the timing alignment information associated with the terminal, and to transmit the data using the power changed by the predetermined magnitude compared to the predetermined reference power based on the calculated number of pieces.

According to another aspect, there is provided a base station to identify a type of a terminal that performs random access and to generate a random access response message based on whether a preamble collision is present. The base station may include at least one processor and may be at least temporarily embodied by the at least one processor. The base station may include an identifier configured to identify a terminal associated with a received preamble as a fixed terminal or a mobile terminal using the received preamble; a determiner the number of times that a preamble having the same value as an index associated with the preamble is received; and a generator configured to generate a random access response message based on a result of the identifying and a result of the determining.

According to an example embodiment, the identifier may be configured to identify the terminal as the fixed terminal or the mobile terminal based on an index size of the preamble.

According to another example embodiment, the identifier may be configured to identify the terminal as the fixed terminal or the mobile terminal based on a root index used for decoding of the preamble.

According to another example embodiments, when the terminal is identified as the fixed terminal and it is determined that two preambles having the same value as the index are received, the generator may be configured to generate the random access response message that includes the index, location information of an uplink resource, and timing alignment information indicating a relatively small value between the two preambles.

According to another example embodiment, when the terminal is identified as the fixed terminal and it is determined that at least three preambles having the same value as the index are received, the generator may be configured to perform back-off.

According to another example embodiment, when the terminal is identified as the mobile terminal and it is determined that a plurality of preambles having the same value as the index is received, the generator may be configured to perform back-off.

According to another example embodiment, when it is determined that a single preamble having the same value as the index is received, the generator may be configured to group a first preamble associated with the index and a second preamble. In addition, the generator may be configured to assign the same uplink resource to a first terminal associated with the first preamble and a second terminal associated with the second preamble. Also, the generator may be configured to group the first preamble and the second preamble in association with that a single preamble having the same value as a second index associated with the second preamble is received.

According to another aspect, there is provided a random access method including determining whether a pre-transmitted preamble and timing alignment information associated with transmission of the preamble are included in a received random access response message; and controlling transmission power of data transmitted through an uplink resource included in the random access response message based on a result of the determining.

According to another aspect, there is provided a random access method including identifying a device associated with a received preamble as a fixed device or a mobile device using the received preamble; determining the number of times that a preamble having the same value as the preamble is received; and generating a random access response message based on a result of the identifying and a result of the determining.

BRIEF DESCRIPTION OF DRAWINGS

FIGS. 3A and 3B illustrate a random access procedure between a terminal and a base station using a dual frame according to an example embodiment.

FIG. 7 illustrates an example of describing a method of determining at least one message index and preamble index according to an example embodiment.

BEST MODE

Figure 1:
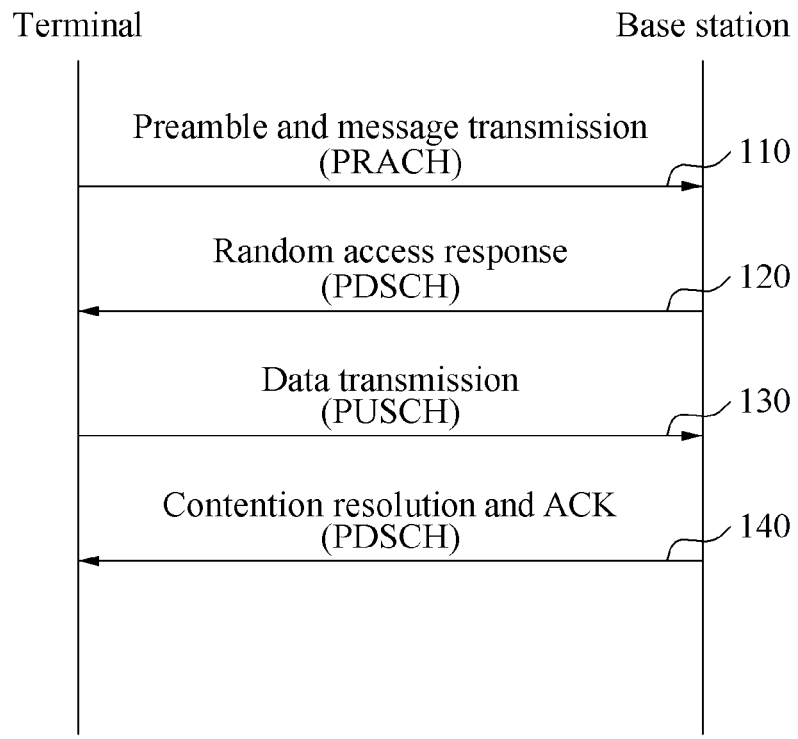
FIG. 1 illustrates a random access procedure between a terminal and a base station according to an example embodiment.

Hereinafter, example embodiments will be described with reference to the accompanying drawings. However, the scope of the disclosure is not limited thereto or restricted thereby. Like reference numerals illustrated in the drawings refer to like elements throughout. Terms used in the following are general and universal ones selected in the related art, however, other terms may also be used based on the development of technology and/or change therein, custom, a preference of a technician, and the like. Accordingly, the terms used in the following should not be understood to limit the technical spirit and should be understood as examples to describe example embodiments.

Also, in particular example embodiments, a term arbitrarily selected by the applicant may be used. In this case, a meaning thereof will be described in a corresponding explanation portion. Accordingly, the terms used herein should be understood based on the meanings thereof and the overall contents herein instead of simply using names of the terms.

FIG. 1 illustrates a random access procedure between a terminal and a base station according to an example embodiment. Referring to FIG. 1, the terminal may encode a preamble and a message and may transmit the encoded preamble and message to the base station using a physical random access channel (PRACH). For example, the message may be scheduling request information for additional data transmission. As another example, the message may be an alarm message that notifies the base station of an emergency situation based on sensed data. Considering the reality that an Internet of Things (IoT) era is on acceleration, a communication method capable of controlling a large number of nodes using limited control plane resources may be required. Accordingly, a communication method of performing connectionless transmission and reception between the terminal and the base station through a random access may be proposed as a solution with respect to a short message as in the example embodiment.

In operation 110, the terminal transmits the message including a scheduling request and the preamble to the base station using the PRACH. In operation 120, the base station assigns a resource to the terminal. In operation 130, the terminal may transmit terminal identification information, for example, user equipment identification (UE ID) information and a desired message to the base station using the resource, thereby enhancing a transmission efficiency.

In operation 110, the terminal may transmit, to the base station, a transmission sequence that includes the preamble and the message. For example, the terminal may set a specific bit of the terminal as a prefix bit. The prefix bit is a bit that enables the base station to identify and determine applications associated with the decoded message. For example, the prefix bit may be associated with a scheduling request. In this case, the terminal transmits a message that includes size information of a desired resource block together with the prefix bit. The size of the resource block is associated with a size of a subsequent message to be transmitted. In the following, a scheduling request message is disclosed as an example of the message that is transmitted together with the preamble in operation 110. However, the message may be converted to various types of transmittable message based on a resource of the PRACH.

In operation 120, the base station transmits a random access response message to the terminal. The base station may calculate a second correlation value between the received sequence and a second Zadoff-Chu sequence corresponding to a first message. The base station may compare the second correlation value to a threshold and may determine whether a random access scheme of the terminal is a conventional scheme or a new simultaneous message transmission scheme. For example, the base station may determine that the message is associated with the scheduling request based on the decoded prefix. Accordingly, the base station may assign a resource block in response to the scheduling request. The base station may transmit an acknowledgement (ACK) for the message to the terminal. In addition, the base station may transmit uplink resource grant information to a node through the random access response message.

In operation 130, the terminal may transmit data using a physical uplink shared channel (PUSCH) assigned from the base station. In operation 130, the terminal may transmit the desired message and the terminal ID.

In operation 140, the base station may receive, from the terminal, data that includes the desired message and the terminal ID. In addition, the base station may transmit an ACK for the data to the terminal. The transmission may be performed through a physical downlink shared channel (PDSCH). Also, in operation 140, the base station may transmit a contention resolution message.

Figure 2:
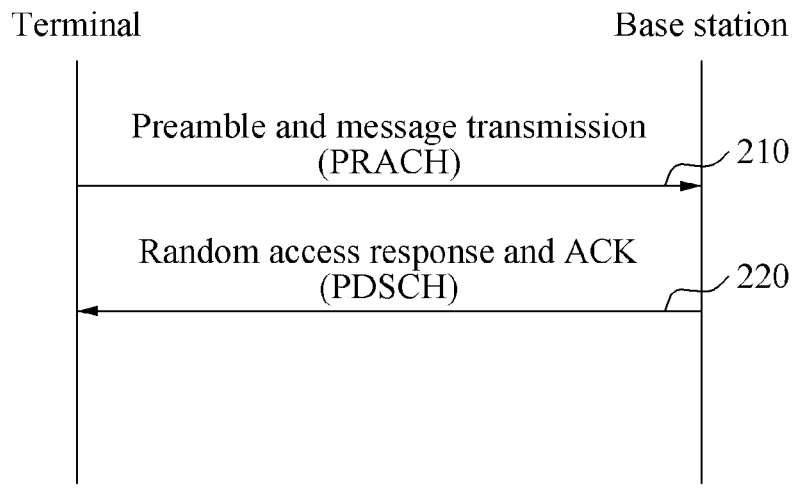
FIG. 2 illustrates a random access procedure between a terminal and a base station using a unit frame according to an example embodiment.

FIG. 2 illustrates a random access procedure between a terminal and a base station using a unit frame according to an example embodiment. FIG. 2 illustrates a process of transmitting and receiving a message using resources corresponding to a first step and a second step in a random access process. The transmission efficiency may be enhanced in that transmission and reception of small data may be performed in the random access procedure without using a separate PUSCH resource.

In operation 210, the terminal may transmit, to the base station, a transmission sequence that includes a preamble and a message. A message bit may include at least one of a prefix, a terminal ID, and a desired message. The prefix may indicate the absence of additional message transmission after transmitting the entire message.

For example, the terminal ID may use location information, such as longitude and latitude of a machine node. Since there is no need to separately assign another specific unique terminal ID, the terminal ID may be applicable to further many machine nodes and may achieve a high applicability. For example, a network capable of quickly verifying a location and a state may be configured by setting location information of a wild animal as a terminal ID and by including state information in the desired message.

As another example, a logical ID designated at the base station may be used as the terminal ID. Once a spatial group is configured within a cell, the same logical ID may be reused between different spatial groups. Thus, the terminal ID may be provided to many nodes and terminals.

As another example, with respect to fixed nodes only, the base station may designate the range of timing alignment (TA) value and may set a group for each TA range. Each of the nodes may belong to a corresponding timing alignment group. In addition, the base station may reuse the logical ID by assigning the same logical ID to nodes that belong to different timing alignment groups and may provide the terminal ID to many nodes.

In operation 220, the base station may transmit a random access response message to the terminal. As described above, since data may be transmitted and received without using a PUSCH resource, the random access response message may not include an uplink resource. In addition, in operation 210, the base station may transmit, to the terminal, an ACK for the message received in operation 210.

FIGS. 3A and 3B illustrate a random access procedure between a terminal and a base station using a dual frame according to an example embodiment. Referring to FIGS. 3A and 3B, a message may be transmitted and received using resources corresponding to a first step and a second step in a random access process, which is similar to FIG. 2. Here, the example embodiment of FIGS. 3A and 3B differs from the example embodiment of FIG. 2 in that data is transmitted using two frames instead of using a single frame.

Referring to FIG. 3A, in operation 310, the terminal may transmit, to the base station, a transmission sequence that includes a preamble and a message. In operation 310, a message bit may include a first prefix. In the example embodiment of FIG. 3A, the terminal transmits a portion of the message through a first frame and transmits a subsequent message through a second frame. Accordingly, the first prefix included in the message bit transmitted in operation 310 may indicate a communication method of transmitting a portion of the entire message and then transmitting the subsequent message. In detail, the first prefix may indicate the number of frames into which the entire message is divided. The base station may decode the first prefix and may determine the number of additional frames to receive the entire message transferred from the terminal.

For example, in operation 310, the message bit may include a terminal ID. In this case, in operation 330, the terminal may transmit the entre desired message.

As another example, in operation 310, the message bit may include a portion of the terminal ID and a portion of the desired message. In this case, the terminal may transmit the remaining terminal ID and the remaining desired message to the base station. The base station may decode the message by merging the messages received in operations 310 and 330. In this case, the base station may perform effective matching between the terminal ID and the desired message. In addition, to match the terminal and the message including the dual frame, the base station may use timing alignment information used in operations 310 and 330.

In operation 320, the base station may transmit a random access response message and an ACK to the terminal. Dissimilar to the example embodiment of FIG. 3B, in the case of receiving each portion of the message in the example embodiment of FIG. 3A, the base station may transmit the random access response message and the ACK as in operations 320 and 340.

As described above, since data may be transmitted and received without using the PUSCH resource, the random access response message may not include an uplink resource grant. In addition, in operation 320, the base station may transmit, to the terminal, the ACK for the message received in operation 310.

In operation 330, the terminal may transmit, to the base station, a transmission sequence that includes the preamble and the message. In operation 330, the message bit may include a second prefix. The second prefix may indicate a communication method of transmitting a remaining of the entire message and terminating transmission.

In operation 340, the base station may transmit a random access response message to the terminal. In addition, in operation 340, the base station may transmit, to the terminal, an ACK for the message received in operation 330.

Referring to FIG. 3B, in operation 350, the terminal may transmit, to the base station, a transmission sequence that includes a preamble and a message. Similar to the method of operation 310, a message bit may include a first prefix and the first prefix may indicate a communication method of transmitting a portion of the entire message and then transmitting a subsequent message.

In operation 360, the terminal may transmit, to the base station, a transmission sequence that includes a preamble and a message. In operation 360, a message bit may include a second prefix. The second prefix may indicate a communication method of transmitting a remaining of the entire message and terminating transmission.

In operation 370, the base station may transmit a random access response message to the terminal. In addition, in operation 370, the base station may transmit, to the terminal, an ACK for the message received in operations 350 and 360. The communication method of FIG. 3B differs from the communication method of FIG. 3A in that the base station transmits the random access response message and the ACK to the terminal after receiving the second prefix indicating that transmission of the entire message is completed in operation 370. Compared to the example embodiment of FIG. 3A, when the second prefix is decoded, the base station may transmit the ACK to the terminal once. With the onset of hyper-connected society, there is a need to efficiently use a control plane resource used to control a large number of nodes. According to the example embodiment of FIG. 3B, the terminal may perform connectionless data transmission and reception without using the control plane resource for connection and the base station may transmit the ACK only once when transmission and reception of the entire data is completed, thereby saving the control plane resource.

Figure 4A:
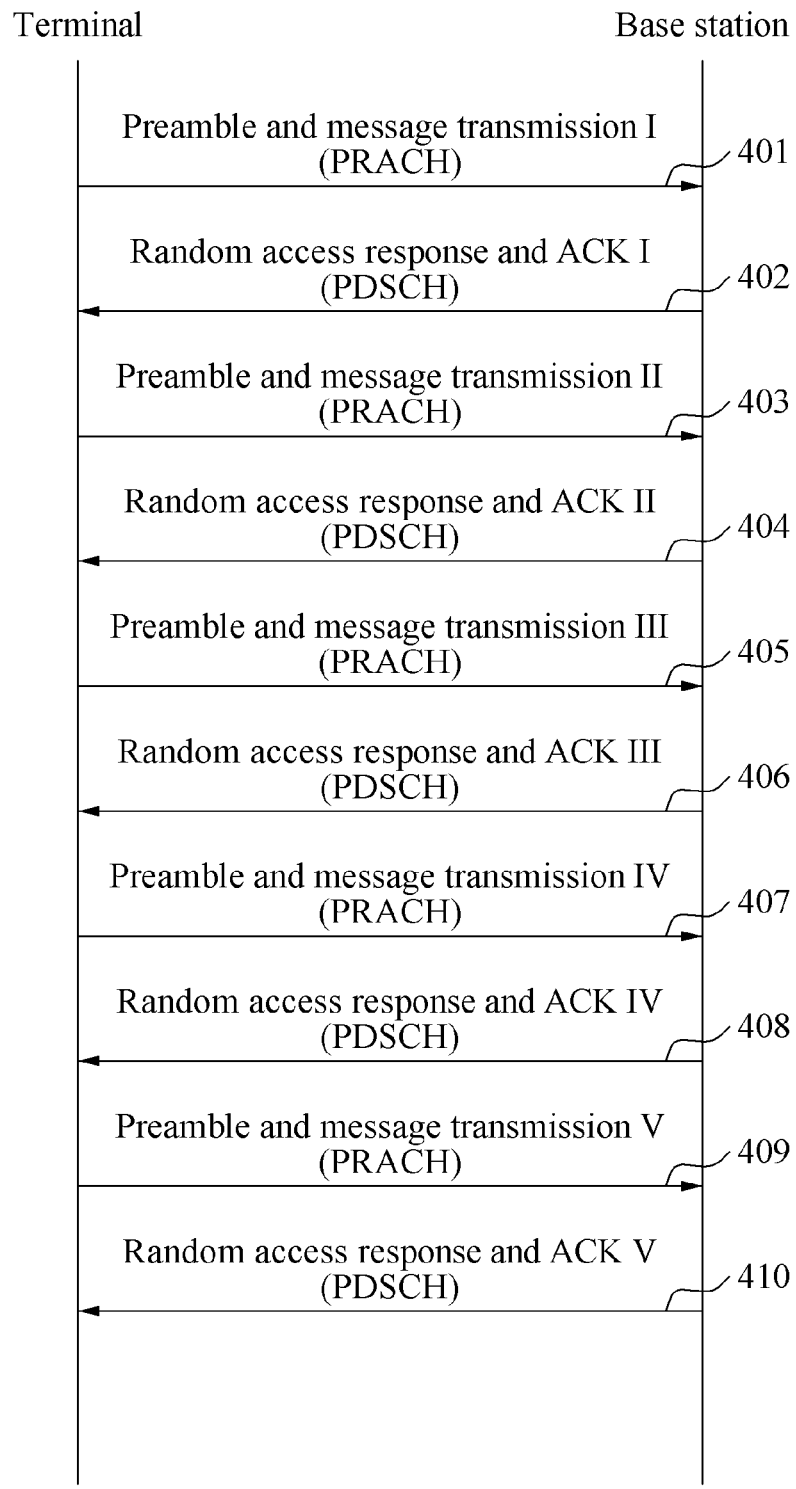
FIGS. 4A and 4B illustrate a random access procedure between a terminal and a base station using a multi-frame according to an example embodiment.
Figure 4B:
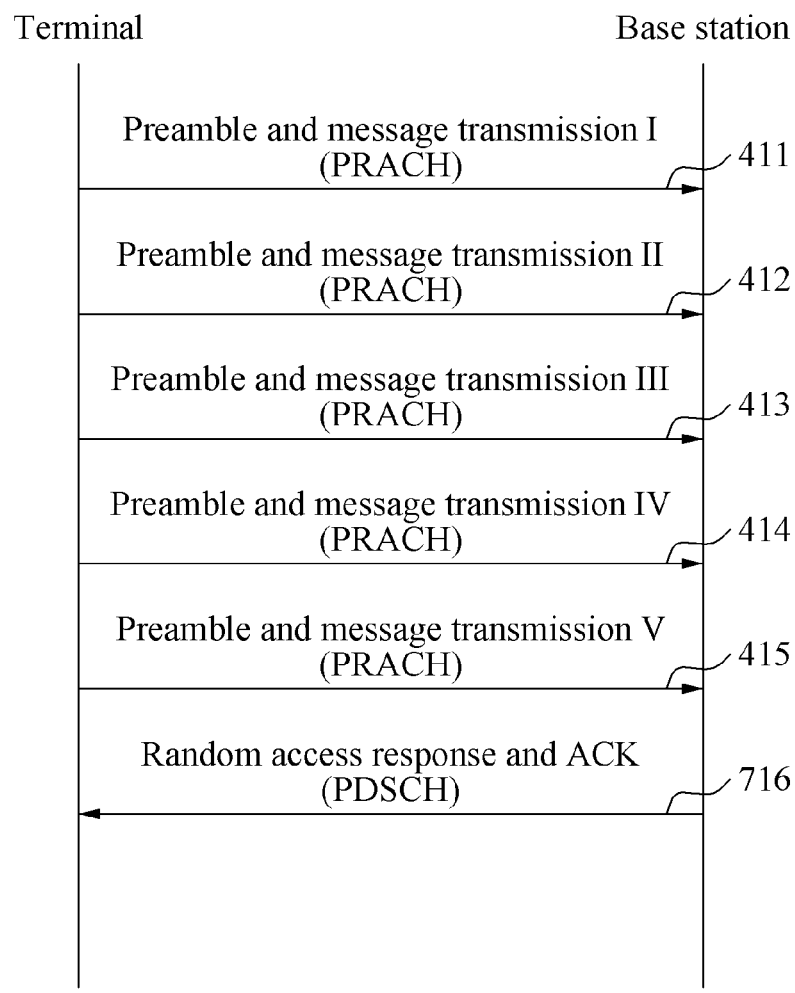

FIGS. 4A and 4B illustrate a random access procedure between a terminal and a base station using a multi-frame according to an example embodiment. Referring to FIG. 4A, operation 401, operation 403, operation 405, operation 407, and operation 409 correspond to an operation in which the terminal transmits a message and a preamble using a resource of a PRACH for the random access procedure. Also, operation 402, operation 404, operation 406, operation 408, and operation 410 correspond to an operation in which the base station transmits an ACK for the message transmitted to the terminal and a random access response message.

The communication method of FIG. 4A will be apparent to one of ordinary skill in the art when referring to the communication methods of FIG. 2A and FIGS. 3A and 3B. Here, a difference of a prefix may be present for each operation. In operation 401, the terminal may transmit, to the base station, a message bit that includes a first prefix. For example, the first prefix may indicate that a terminal ID is transmitted together with start of message transmission. In operations 403, 405, and 407, the terminal may transmit, to the base station, a message bit that includes a second prefix. For example, the second prefix may indicate a communication method of transferring a consecutive message. As another example, in each of operations 403, 405, and 407, the terminal may transmit a different prefix to the base station. The respective prefixes may represent the order of consecutive messages. Also, in operation 409, the terminal may transmit, to the base station, a message bit that includes a third prefix. The third prefix may indicate a last of transmission of the consecutive messages.

As described above, referring to FIG. 4B, operation 411, operation 412, operation 413, operation 414, and operation 415 correspond to an operation in which the terminal transmits a message and a preamble using a resource of a PRACH for the random access procedure. Operations of FIG. 4B will be apparent to one of ordinary skill in the art when referring to the description of FIG. 4. Here, operation 416 differs from FIG. 4A. Similar to operation 370 of FIG. 3B, in operation 416, the base station may transmit the random access response message and the ACK to the terminal after receiving the prefix indicating that transmission of the entire message is completed.

Figure 5:
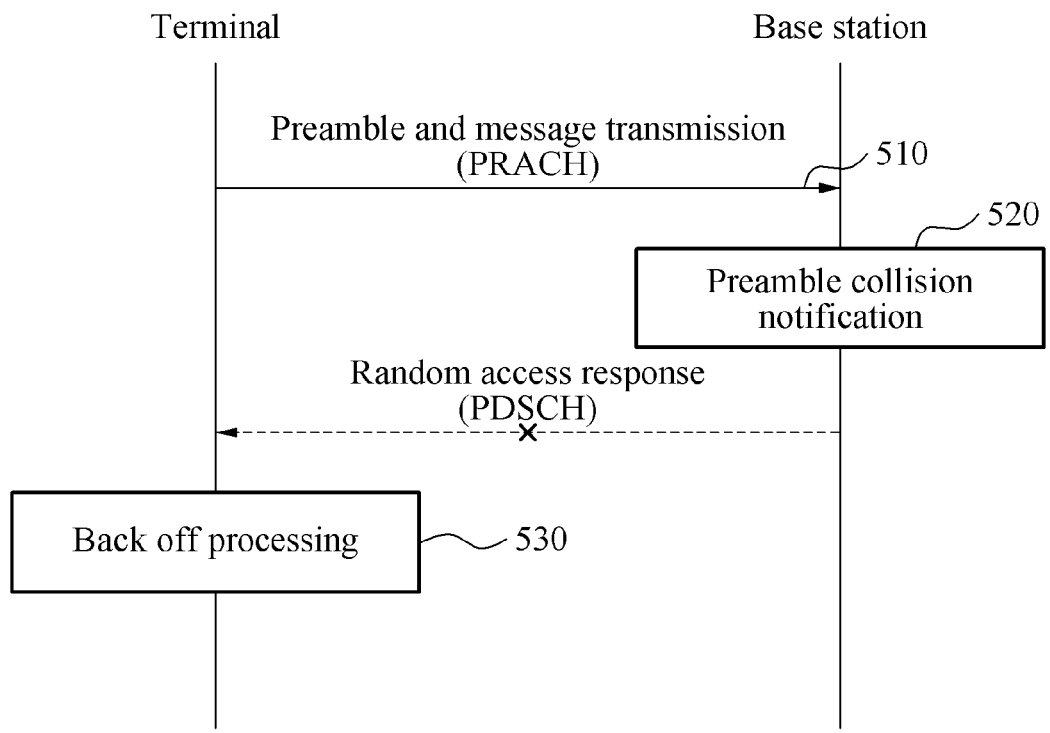
FIG. 5 illustrates a random access procedure between a terminal and a base station according to another example embodiment.

FIG. 5 illustrates a random access procedure between a terminal and a base station according to another example embodiment. In operation 510, the terminal may transmit, to the base station, a transmission sequence that includes a preamble and a message. The terminal may select and use a preamble corresponding to a predetermined communication scheme with the base station. In detail, if a Zadoff-Chu sequence length $N_{ZC}$ and a cyclic shift size $N_{cs}$ of the preamble are given, the number $N_{PA}$ of preamble sequences transmittable from the terminal to the base station may be determined according to Equation 1.

$$N_{PA} = \left\lfloor \frac{N_{ZC}}{N_{cs}} \right\rfloor \quad \text{[Equation 1]}$$

For example, when the terminal and the base station follow a Long Term Evolution (LTE) standard, $N_{ZC}=839$ and $N_{cs}=13$ may be given, and the number $N_{PA}$ of preamble sequences may be determined as $N_{PA}=64$ according to Equation 1. Accordingly, the terminal may select a single preamble from among 64 preamble sequences and may transmit the selected preamble to the terminal through a PRACH.

Here, in the case of a conventional random access method, a random access response message corresponding to the preamble may be transmitted from the base station to the terminal using a PDSCH. If a message received from the terminal to the base station using a physical uplink shared channel (PUSCH) is not decoded, the base station may recognize the presence of a collision in the preamble used at the terminal.

In the case of following the conventional method, the base station may recognize the preamble collision only after transmitting the random access response message and also assigning a portion of resources of a PUSCH to the terminal. As described above, the conventional method uses an unnecessary control plane resource and recognizes the preamble collision only through a failure in decoding the message. In this aspect, the conventional random access procedure needs to be enhanced by considering a wireless network environment in which the number of nodes rapidly increases.

In operation 520, the base station may detect a preamble index using the received sequence. In addition, the base station may additionally detect a message index using the received sequence. The base station may determine whether a preamble collision is present based on the number of detected message indices. In detail, when a plurality of message indices are detected, the base station may determine that the same preamble is used at a plurality of terminals and may detect the presence of the preamble collision. In response to detecting the presence of the preamble collision, the base station may not transmit a random access response message for the preamble. Hereinafter, a process of detecting, at the base station, a message index will be further described with reference to the following additional drawings.

In operation 530, the terminal may determine whether the random access response message corresponding to the transmitted preamble is received. When it is determined that the random access response message is not received, the terminal may perform back-off corresponding to a preset time interval.

Although not illustrated in FIG. 5, when it is determined that the random access response message is received, the terminal may transmit a scheduling request message to the base station using an uplink resource included in the random access response message, which is similar to the conventional random access method.

Figure 6:
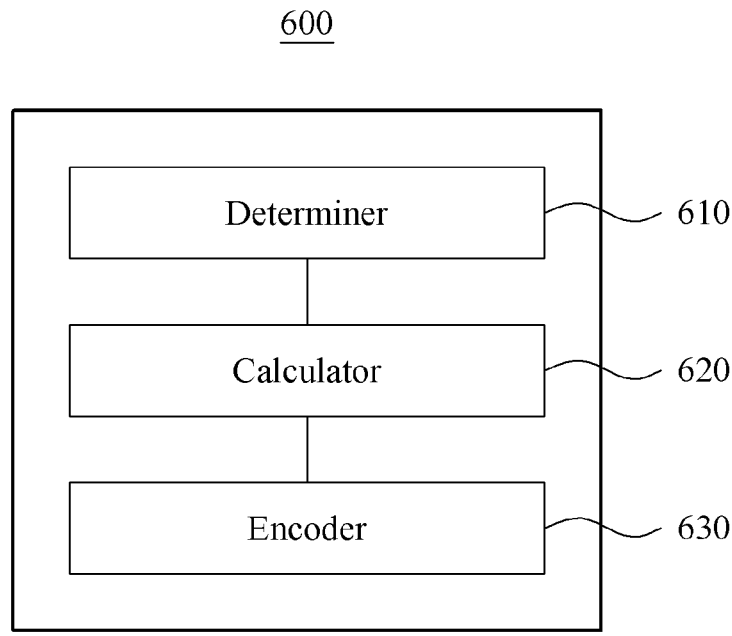
FIG. 6 is a block diagram illustrating a terminal according to an example embodiment.

FIG. 6 is a block diagram illustrating a terminal according to an example embodiment. A terminal 600 may transmit a message to a base station using a PRACH during a random access process. Since a short message may be transmitted and received during the random access process, transmission efficiency may be enhanced.

Referring to FIG. 6, the terminal 600 may include a determiner 610, a calculator 620, and an encoder 630. The determiner 610 may determine a transmittable message size corresponding to a PRACH based on a communication scheme predetermined between the base station and the terminal 600. In detail, the determiner 610 may determine a transmittable message size based on random access information received from the base station. The random access information may include at least one of a cyclic shift size $N_{cs}$ of a preamble, the number $N_{PA}$ of preamble sequences, a Zadoff-Chu sequence length $N_{ZC}$, a preamble root index r, and a message root index function set $\{k_1=f_1(i), k_2=f_2(i), \ldots, k_N=f_N(i)\}$. Here, N denotes the number of elements included in the message root index function.

The determiner 610 may determine the transmittable message size according to Equation 2.

Transmittable message size=$\lfloor \log_2 N_{PA} \rfloor + \lfloor \log_2 N_{ZC} \rfloor * N$ [Equation 2]

For example, in the case of following an LTE standard, if $N_{cs}=13$, $N_{PA}=64$, and $N_{ZC}=839$ are given and N is assumed to be 1, the determiner 610 may determine a current transmittable message size as 15 bits.

For example, if N is assumed to be 1 without being limited, the determiner 610 may calculate a transmittable message size corresponding to $N_{PA}$ and $N_{ZC}$ as shown in Table 1. In the existing LTE standard, a Zadoff-Chu sequence with the length of $N_{ZC}=839$ was transmitted by setting 1 ms subframe as a time axis length of a PRACH. To transmit a Zadoff-Chu sequence with an extended length ($N_{ZC}>839$), the time axis length of the PRACH may need to be configured using a plurality of subframes.

In addition, when the terminal 600 needs to transmit a message increased to be greater than the Zadoff-Chu sequence length corresponding to the predetermined communication scheme, the determiner 610 may determine the increased message to be transmitted using the plurality of subframes corresponding to the PRACH.

TABLE 1

| $N_{ZC}$ (length) | 109 | 211 | 419 | 839(LTE) | 1667 | 3329 | 6659 |
|---|---|---|---|---|---|---|---|
| $N_{PA}$ (number) | 8 | 16 | 32 | 64(LTE) | 128 | 256 | 512 |
| Message bits | 9 | 11 | 13 | 15(LTE) | 17 | 19 | 21 |

In addition, if $N_{cs}=13$, $N_{PA}=64$, and $N_{ZC}=839$ are assumed based on the LTE standard, the determiner 610 may calculate a transmittable message size corresponding to the number N of elements included in the message root index function set according to Table 2.

TABLE 2

| | N (number) | | | | | | |
|---|---|---|---|---|---|---|---|
| | 1 | 2 | 3 | 4 | 5 | 6 | 7 |
| Message bits | 15 | 24 | 33 | 42 | 51 | 60 | 69 |

The calculator 620 may set a message desired to be transmitted from the terminal 600 within the transmittable message size, and may calculate each of the preamble index and at least one message index from the message. The calculator 620 may set the message to be transmitted to the base station within the calculated message size. Also, the calculator 620 may determine the preamble index based on a first bitstream within the message and may determine each message index from a first message index to an $N^{th}$ message index based on each bitstream from a second bitstream to an $(N+1)^{th}$ bitstream.

The first bitstream may correspond to $\lfloor \log_2 N_{PA} \rfloor$ bits within the message. In detail, the calculator 620 may determine a preamble index i by converting a binary value corresponding to $\lfloor \log_2 N_{PA} \rfloor$ bits within the message to a decimal number. Each bitstream from the second bitstream to the $(N+1)^{th}$ bitstream may correspond to $\lfloor \log_2 N_{ZC} \rfloor$ bits of each of the first message to the $N^{th}$ message. Likewise, the calculator 620 may determine each message index from a first message index $l_1$ to an $N^{th}$ message index $l_N$ by converting a binary value corresponding to $\lfloor \log_2 N_{ZC} \rfloor$ bits within each message from the first message to the $N^{th}$ message to a decimal number. For example, the preamble index i may be one of integers from 0 to $2\lfloor \log_2 N_{PA} \rfloor-1$. For example, if $N_{PA}$ is a multiple of 2, the preamble index i may be one of integers from 0 to $N_{PA}-1$. The first message index $l_1$ may be one of integers from 0 to $2\lfloor \log_2 N_{ZC} \rfloor-1$.

As another example, the calculator 620 may iteratively extract at least one message bitstream corresponding to each of the at least one message index from a start bit of the set message, and may extract a preamble bitstream from the remaining message.

The encoder 630 may encode each of the preamble index and at least one message index and may transmit the same to the base station. For example, the message index set may include message indices from the first message index $l_1$ the $N^{th}$ message index $l_N$. In addition, the encoder 630 may generate a preamble sequence using a Zadoff-Chu sequence. In general, the Zadoff-Chu sequence is expressed as shown in Equation 3.

$$z_r[n] = \exp\left(-j\pi r \frac{n(n+1)}{N_{ZC}}\right) \quad \text{[Equation 3]}$$

In Equation 3, r denotes a preamble root index and n denotes an integer between 0 and $N_{ZC}-1$. The encoder 630 may generate the preamble sequence based on Equation 3. For example, the generated preamble sequence may be expressed as shown in Equation 4.

$$p_{r,i}[n]=z_r[(n+N_{CS}\times i)\bmod N_{ZC}] \quad \text{[Equation 4]}$$

In Equation 4, $N_{CS}$ denotes a cyclic shift size that is determined based on a radius of a given cell. The encoder 630 generates the preamble sequence by cyclic-shifting the Zadoff-Chu sequence by a multiple of $N_{CS}$. The encoder 630 may generate the preamble sequence by applying the preamble index i calculated by the calculator 620 according to Equation 4.

Meanwhile, the calculator 620 may calculate at least one message root index different from a preamble root index r using each of at least one message root index function that uses the preamble index i as an independent variable. In addition, the encoder 630 may generate the message sequence using the Zadoff-Chu sequence. The encoder 630 may generate a first message sequence using a Zadoff-Chu sequence associated with a first message root index $k_1$. The encoder 630 may determine the first message root index $k_1$ based on a first message root index function $k_1=f_1(i)$. Here, $f_1(i)$ denotes a function that uses the preamble index i as an input and the first message root index $k_1$ as an output, and determines $k_1$ so that the preamble root index r and the first message root index $k_1$ have different values. The preamble root index and the first message root index need to have different values to establish a cross-correlation between a first Zadoff-Chu sequence associated with the preamble and a second Zadoff-Chu sequence associated with the first message. The encoder 630 may generate the first message sequence according to Equation 5.

$$m_{k_1,l_1}[n]=z_{k_1}[(n+N_{CS}\times i+l_1)\bmod N_{ZC}] \quad \text{[Equation 5]}$$

The encoder 630 may generate the first message sequence by substituting Equation 5 with the first message index $l_1$ calculated at the calculator 620. Compared to the aforementioned preamble sequence, the first message sequence is a sequence acquired by additionally cyclic-shifting the preamble sequence by a size of the first message index $l_1$. Generating the second message sequence to the $N^{th}$ message sequence by expanding the method of generating the first message sequence will be apparent to one of ordinary skill in the art.

That is, the encoder 630 may generate each of a preamble sequence acquired by cyclically shifting a Zadoff-Chu sequence corresponding to a preamble root index by a constant value corresponding to the preamble index and a message sequence acquired by cyclically shifting a Zadoff-Chu sequence corresponding to each of the at least one message root index by a sum of the constant value corresponding to the preamble index and each of the at least one message index, and may transmit the generated preamble sequence and message sequence to the base station.

The entire transmission sequence transmitted from the terminal 600 to the base station may be expressed as shown in Equation 6.

$$X_{r,K}[n] = \beta_{pre} z_r [(n + N_{CS} \times i) \bmod N_{ZC}] + \\ \beta_{msg1} z_{k_1} [(n + N_{CS} \times i + l_1) \bmod N_{ZC}] + \ldots + \\ \beta_{msg_N} z_{k_N} [(n + N_{CS} \times i + l_N) \bmod N_{ZC}]$$

[Equation 6]

The terminal 600 may transmit a transmission sequence that includes all of the preamble sequence and the message sequence. In Equation 6, $\beta_{pre}$ denotes the signal strength associated with the preamble sequence, $\beta_{msg1}$ denotes the signal strength associated with the first message sequence, and $\beta_{msg2}$ denotes the signal strength associated with the $N^{th}$ message sequence.

The terminal 600 may perform the random access by selecting one of a simultaneous message transmission mode for simultaneously transmitting the preamble and the message and a preamble transmission mode corresponding to the conventional random access method. Accordingly, although not illustrated in FIG. 6, the terminal 600 may further include a selector. The selector may include one of the preamble transmission mode and the simultaneous message transmission mode. When the selector selects the preamble transmission mode, the encoder 630 may encode the preamble index and may transmit the encoded preamble index to the base station. In this case, the terminal 600 may perform the random access by transmitting only the preamble to the base station, which is similar to the related art.

Figure 7:
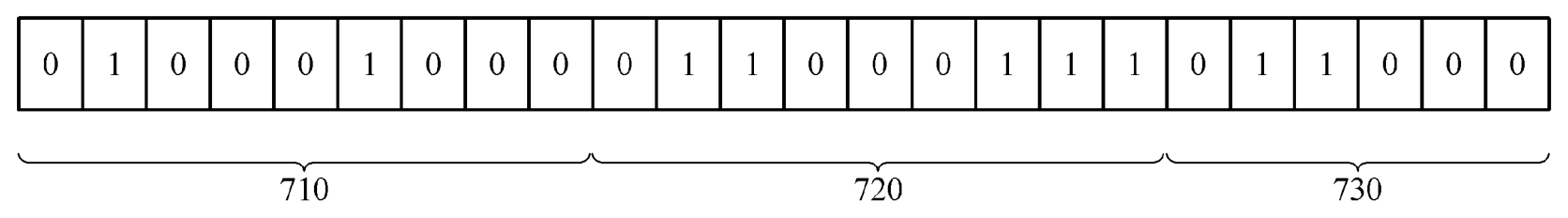

FIG. 7 illustrates an example of describing a method of determining at least one message index and preamble index according to an example embodiment. FIG. 7 illustrates a 24-bit message transmittable if $N_{PA}=64$, $N_{ZC}=839$, and $N=2$ based on the LTE standard. Here, 010001000011000111011000 denotes a bitstream desired to be transmitted from a terminal to a base station. In this case, the terminal may extract a first bitstream 710 corresponding to $\lfloor \log_2 N_{ZC} \rfloor$ bits from a start of a message. For example, 010001000 may be extracted as the first bitstream 710. Here, a decimal number value, 136, corresponding to a binary number 010001000 may be calculated. The terminal may determine 136 as a first message index $l_1$ associated with a first message. Similarly, the terminal may extract a second bitstream 720 corresponding to $\lfloor \log_2 N_{ZC} \rfloor$ bits from a subsequent bit of the first bitstream. For example, 011000111 may be extracted as a second bitstream 720. Here, a decimal number value, 199, corresponding to a binary number 011000111 may be calculated. The terminal may determine 199 as a second message $l_2$ index associated with a second message. Similarly, the terminal may extract a third bitstream 730 corresponding to $\lfloor \log_2 N_{PA} \rfloor$ bits from a subsequent bit of the second bitstream 720. For example, 011000 may be extracted as the third bitstream 730. A decimal number value, 24, corresponding to a binary number 011000 may be calculated. The terminal may determine 24 as a preamble index i associated with the preamble.

Figure 8A:
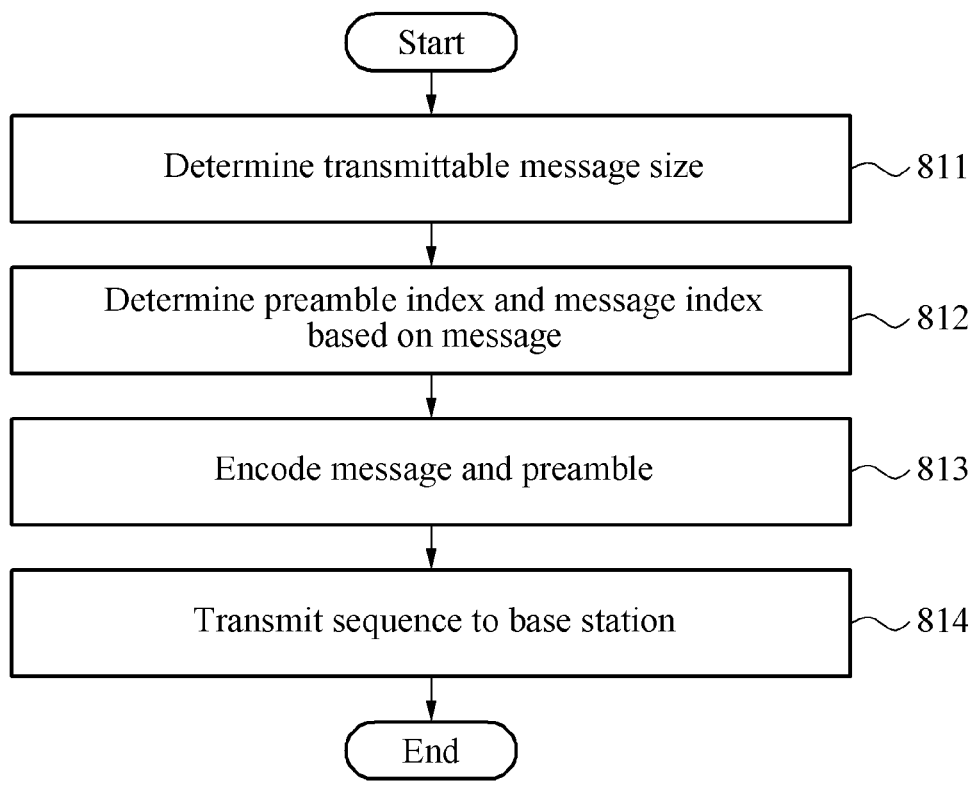
FIGS. 8A and 8B are flowcharts illustrating a communication method of a terminal that performs a random access procedure with a base station according to an example embodiment.
Figure 8B:
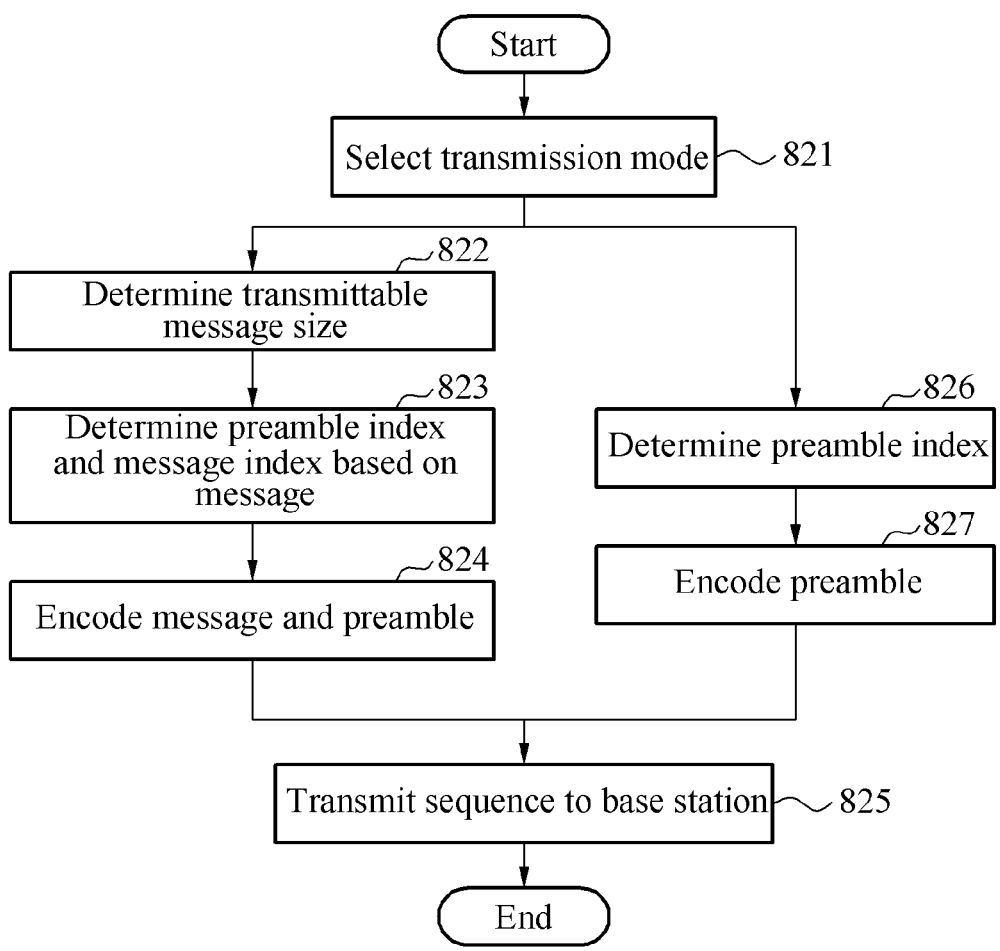

FIGS. 8A and 8B are flowcharts illustrating a communication method of a terminal that performs a random access procedure with a base station according to an example embodiment. In the case of following the communication method, the terminal may perform operation 811 of determining a transmittable message size in a start operation of performing the random access procedure. The terminal may determine a transmittable message size corresponding to a communication scheme with the base station. Operation 811 may be performed at a determiner temporarily embodied by a processor included in the terminal. The base station may transmit, for example, broadcast random access information corresponding to the predetermined communication scheme to terminals present within a predetermined range. The terminal may determine a message size based on the received random access information in operation 811. In detail, the random access information may include at least one of a cyclic shift size of a preamble, the number of preambles, a preamble sequence length, a preamble root index, and a message root index function set.

In addition, in operation 812, the terminal determines a preamble index and at least one message index based on the set message. The terminal may determine a message corresponding to the message size determined in operation 811. The message may be a desired message that the terminal desires to transmit to the base station. In operation 812, the terminal may extract a first bitstream corresponding to $\lfloor \log_2 N_{ZC} \rfloor$ bits from start of the message and may extract a second bitstream corresponding to $\lfloor \log_2 N_{ZC} \rfloor$ bits from a subsequent bit of a subsequent message. In addition, the terminal may extract an $N^{th}$ bitstream by iterating the above bitstream extraction. In addition, the terminal may extract an $(N+1)^{th}$ bitstream corresponding to the remaining $\lfloor \log_2 N_{PA} \rfloor$ bits in the message. The terminal may determine each of at least one message index by converting a binary number corresponding to each bitstream from the first bitstream to the $N^{th}$ bitstream to a decimal number value. Here, the at least one message index may include the first message index $l_1$ corresponding to the first bitstream to the $N^{th}$ message index $l_N$ corresponding to the $N^{th}$ bitstream. Also, the terminal may determine the preamble index i by converting the binary number corresponding to the $(N+1)^{th}$ bitstream to the decimal number value.

In operation 813, the terminal encodes the message and the preamble. In addition, in operation 813, a preamble sequence and a message sequence may be generated. In operation 813, the preamble sequence and the message sequence may be generated using a Zadoff-Chu sequence. The description made above with the encoder 630 of FIG. 6 may be applicable to operation 813. In operation 814, the terminal may complete a first step for the random access procedure by transmitting, to the base station, a sequence in which the preamble and at least one message are encoded. In detail, the transmission may be performed using a PRACH.

FIG. 8B is a flowchart illustrating a communication method of a terminal that performs a random access procedure with a base station according to another example embodiment. Compared to the example embodiment of FIG. 8A, the communication method of FIG. 8B may include operations that may be additionally performed. The terminal may selectively perform operation 821. In operation 821, the terminal may select one of a preamble transmission mode corresponding to a conventional random access method and a message transmission mode for simultaneously transmitting a preamble and a message. The description made above with operations 811, 812, and 813 may be applicable to operations 822, 823, and 824 performed in response to a selection on the message transmission mode.

Here, when the preamble transmission mode is selected in operation 821, operation 826 of determining a preamble index and operation 827 of encoding the preamble may be performed, and compared to operations 823 and 834, differ in that an operation of determining the message index and an operation of encoding the message are not performed.

Figure 9:
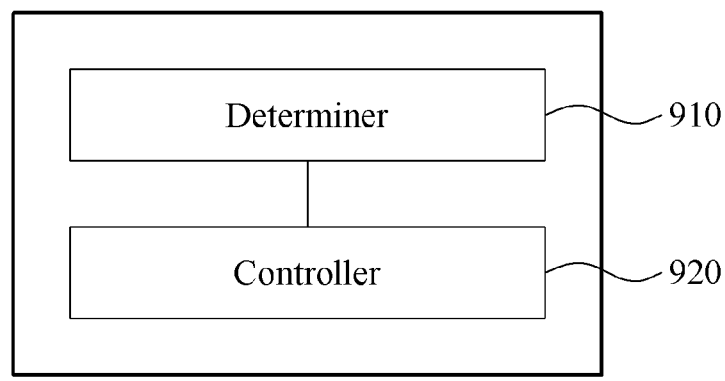
FIG. 9 is a block diagram illustrating a terminal according to another example embodiment.

FIG. 9 is a block diagram illustrating a terminal according to another example embodiment. A terminal 900 includes a processor, and may perform a random access procedure with a base station. In addition, the terminal 900 may be temporarily embodied by the processor. Referring to FIG. 9, the terminal 900 may include a determiner 910 and a controller 920.

The determiner 910 may determine whether a random access response message corresponding to a transmitted sequence is received. The transmitted sequence may include a preamble and at least one message. In addition, the transmitted sequence may be a sequence that is transmitted from the terminal 900 to the base station using a resource of a PRACH. For example, the determiner 910 may determine whether the random access response message is received in a first time interval from an initial transmission point in time of the sequence. Accordingly, when it is determined that the random access response message is not received even after the first time interval, the determiner 910 may determine that reception of the random access response message is a failure.

When the determiner 910 determines that the random access response message is not received, the controller 920 may perform back-off corresponding to a preset second time interval. When a reception failure is verified from the random access response message, the terminal 900 may delay start of a new random access procedure by performing back-off. Accordingly, another terminal that is currently performing the random access procedure with the base station or performing data transmission and reception using the base station may complete data transmission and reception in a further flexible communication environment.

On the contrary, when the determiner 910 determines that reception of the random access response message is a success, the controller 920 may transmit an additional message to the base station using an uplink resource included in the random access response message. For example, the additional message may be a scheduling request message. In detail, the determiner 910 may retrieve a random response message corresponding to the terminal 900 based on a preamble ID included in the random access response message, and may verify information about the uplink resource. In addition, the determiner 910 may verify that reception of the random access response message is a success and also a message included in the transmitted sequence is successfully decoded at the base station.

Figure 10:
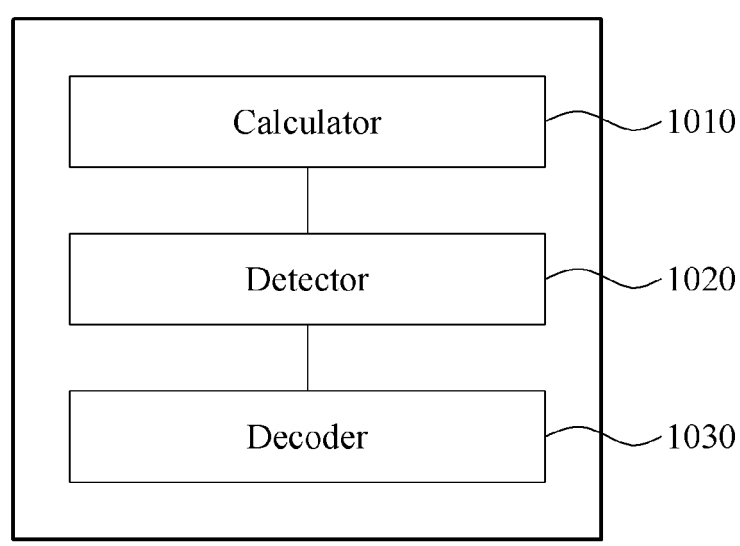
FIG. 10 is a block diagram illustrating a base station according to an example embodiment.

FIG. 10 is a block diagram illustrating a base station according to an example embodiment. A base station 1000 according to an example embodiment may be at least temporarily embodied by at least one processor.

Referring to FIG. 10, the base station 1000 may include a calculator 1010, a detector 1020, and a decoder 1030. The calculator 1010 may calculate a first correlation value to an $(N+1)^{th}$ correlation value based on the received sequences. The base station 1000 may represent a signal associated with the received sequence as given in Equation 7.

$$Y_{r,K}[n] = \sum_{j=0}^{J} h(j) \times X_{r,K}[(n+t_j) \bmod N_{zc}] + W[n] \quad \text{[Equation 7]}$$

In Equation 7, $h_j$ denotes a channel coefficient corresponding to a $j^{th}$ multipath, and $t_j$ denotes a delay shift corresponding to the $j^{th}$ multipath. K denotes a message root index function set $K=\{k_1=f_1(i), k_2=f_2(i), \ldots, k_N=f_N(i)\}$ that includes each message root index function as an element. $W[n]$ denotes a noise signal with a mean of 0 and a variance of $\sigma^2$.

The calculator 1010 may calculate a correlation value between $Y_{r,K}[n]$ and a first Zadoff-Chu sequence associated with a preamble root index r. In detail, the calculator 1010 may calculate the first correlation value associated with the preamble index according to Equation 8.

$$|C_{(r,K),r}[\tau]| = \left| \frac{1}{\sqrt{N_{zc}}} \sum_{n=0}^{N_{zc}-1} Y_{r,K}[n] \times z_r^*[n+\tau] \right| \quad \text{[Equation 8]}$$

$$= \sum_{j=1}^{J} \sqrt{N_{zc}} |h_j| \delta[\tau - (N_{cs} \times i + t_j)] + W[\tau]$$

Referring to Equation 8, a location number of a sequence having a peak value associated with a preamble may be calculated as $N_{CS} \times i + t_j$. The detector 1020 may determine a preamble detection region corresponding to the location number and may calculate a preamble index i. For example, in Equation 8, the preamble index i may be detected from a region greater than or equal $\tau = N_{CS} \times (i-1)$ and less than $\tau = N_{CS} \times i - 1$ corresponding to a detection region.

In addition, the calculator 1010 may calculate at least one message root index that is determined based on the preamble index i, using the message index function set K. In addition, the calculator 1010 may calculate a correlation value corresponding to each of the at least one message index using a Zadoff-Chu sequence corresponding to at least one message root index.

For example, the calculator 1010 may calculate a second correlation value between $Y_{r,K}[n]$ and a second Zadoff-Chu sequence associated with a first message root index $k_1$ to calculate a location number of a sequence having a peak value associated with a first message. In detail, the calculator 1010 may calculate the second correlation value according to Equation 9.

$$|C_{(r,K),k_1}[\tau]| = \left| \frac{1}{\sqrt{N_{zc}}} \sum_{n=0}^{N_{zc}-1} Y_{r,K}[n] \times z_{k_1}^*[n+\tau] \right| \quad \text{[Equation 9]}$$

$$= \sum_{j=1}^{J} \sqrt{N_{zc}} |h_j| \delta[\tau - (N_{cs} \times i + l_1 + t_j)] + W[\tau]$$

Referring to Equation 9, the location number of the sequence having the peak value associated with the first message may be calculated as $N_{CS} \times i + t_j + l_2$. The detector 1020 may calculate a first message index by calculating a difference between the location number associated with the preamble and the location number associated with the first message. A process of detecting each of at least one message index will be described with reference to the accompanying drawings below.

The decoder 1030 may decode the message transmitted from the terminal through the random access procedure using at least one message index and the preamble index detected through the detector 1020. The message may include at least one of quality of service (QoS) information, scheduling request information, and terminal ID information, for example, UE ID information.

When a magnitude of the peak value associated with the first message is less than a threshold, the decoder 1030 may decode only the preamble corresponding to the preamble index, which is similar to the conventional random access method.

In addition, the decoder 1030 may identify a predetermined prefix bit from the decoded message, and may determine an operation mode of the terminal based on the prefix bit. In detail, the decoder 1030 may determine, as the operation mode of the terminal, at least one of a first mode for transmitting a subsequent message using a random access resource, a second mode for transmitting the message through a unit frame and terminating the transmission, and a third mode for transmitting the subsequent message through an additional frame.

When the operation mode of the terminal is the first mode, the decoded message may include resource block size information used to transmit the subsequent message. When the operation mode is the third mode, the decoder 1030 may determine the message as a portion of the entire message transmitted from the terminal and may merge the subsequent message decoded from the additional frame.

Figure 11:
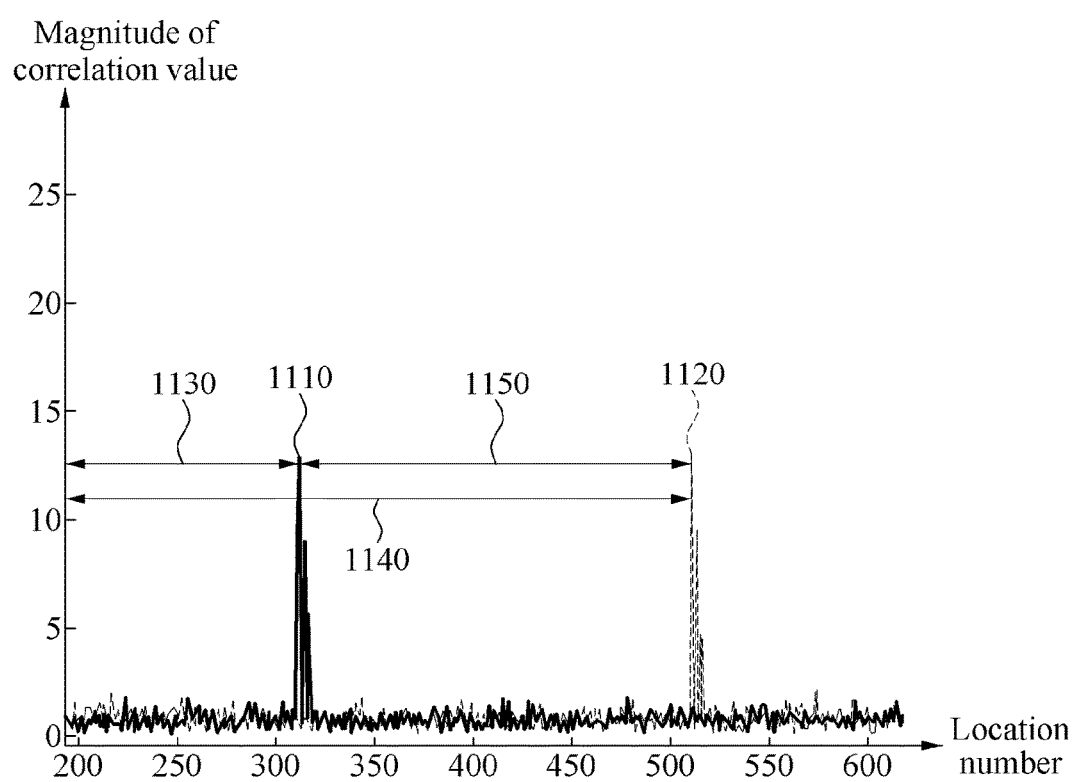
FIG. 11 is a graph showing a process of detecting a message index according to an example embodiment.

FIG. 11 is a graph showing a process of detecting a message index according to an example embodiment. Here, X axis denotes a location number of a correlation value and Y axis denotes a magnitude of the correlation value. An example in which a terminal transmits a sequence in which a preamble and a first message are encoded to a base station through a random access procedure will be described with reference to FIG. 11. Dissimilar to the example embodiment, the terminal may transmit a preamble and at least one message to the base station based on a message size corresponding to a communication scheme.

Referring to FIG. 11, a peak value 1110 denotes a peak value associated with the preamble.

The base station may calculate a correlation value between $Y_{r,K}[n]$ and a first Zadoff-Chu sequence associated with a preamble root index r according to Equation 7. The base station may calculate a location number 1130 of the peak value 1110 associated with the preamble based on the calculated correlation value of the first Zadoff-Chu sequence.

Referring to Equation 8, the location number 1130 of the peak value 1110 associated with the preamble may be calculated as $N_{CS} \times i + t_j$. The base station may determine a preamble detection region that includes a location number corresponding to the peak value 1110, and may calculate a preamble index i. For example, as expressed in Equation 8, the preamble index i may be detected within a region greater than or equal to $\tau = n = N_{CS} \times (i-1)$ and less than or equal to $\tau = N_{CS} \times i - 1$ corresponding to the detection region.

In addition, a first message root index $k_1$ different from the preamble root index r may be calculated by substituting a first message root function $k_1 = f_1(i)$ with the preamble index i. As described above, a cross-correlation property of a Zadoff-Chu sequence may be used so that the base station may simultaneously decode at least one message and the preamble received from the terminal. Accordingly, the base station may need to set and calculate the message root index different from the preamble root index.

A peak value 1120 represents a peak value associated with a first message. To detect a location number 1140 of the peak value 1120 associated with the first message, the base station may calculate a second correlation value between $Y_{r,K}[n]$ and a second Zadoff-Chu sequence associated with the first message root index $k_1$ according to Equation 9.

Referring to Equation 9, the location number 1140 of the peak value 1120 associated with the first message may be calculated as $N_{CS} \times i + t_j + l_1$. The base station may calculate a difference between the location number 1130 and the location number 1140 and may calculate a first message index $l_1$ 1150. Depending on cases, the base station may calculate the first message index $l_1$ according to Equation 10.

$$l_1 = \begin{cases} \Omega_{msg} - \Omega_{pre} & \text{if } \Omega_{msg} > \Omega_{pre} \\ N_{ZC} - \Omega_{pre} + \Omega_{msg} & \text{if } \Omega_{msg} < \Omega_{pre} \end{cases} \quad \text{[Equation 10]}$$

In Equation 10, $\Omega_{pre}$ denotes a location number corresponding to a preamble peak value and $\Omega_{msg}$ denotes a location number corresponding to a message peak value. If $\Omega_{msg}$ is greater than $\Omega_{pre}$, the first message index $l_1$ may be calculated by subtracting $\Omega_{pre}$ from $\Omega_{msg}$. On the contrary, if $\Omega_{pre}$ is greater than $\Omega_{msg}$, the first message index $l_1$ may be calculated by adding $N_{ZC}$ to a value acquired by subtracting $\Omega_{pre}$ from $\Omega_{msg}$.

Figure 12:
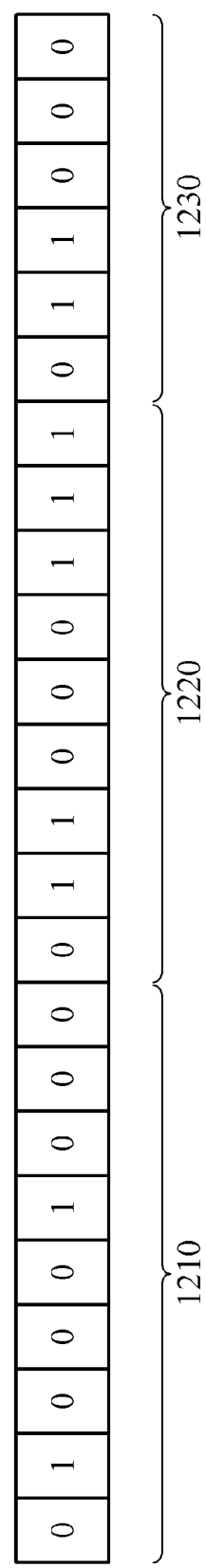
FIG. 12 illustrates an example of describing a method of determining a first message index, a second message index, and a preamble index to decode a message according to an example embodiment.

FIG. 12 illustrates an example of describing a method of determining a first message index, a second message index, and a preamble index to decode a message according to an example embodiment. As described above with FIG. 11, the base station may detect a first message index $l_1$, a second message index $l_2$, and a preamble index i from a received sequence. As an example, it is assumed that a transmittable message bit is 24 bits if $N_{PA}=64$, $N_{ZC}=839$, and $N=2$ based on an LTE standard. The base station may detect first message index $l_1=136$, second message index $l_2=199$, and preamble index i=24 from the received sequence. A binary value, that is, a first bitstream 1210, of $\lfloor \log_2 N_{ZC} \rfloor$ bits corresponding to the first message index $l_1=136$ is 010001000. A binary value, that is, a second bitstream 1220, of $\lfloor \log_2 N_{ZC} \rfloor$ bits corresponding to the second message index $l_2=199$ is 011000111. In addition, a binary value, that is, a third bitstream 1230, of $\lfloor \log_2 N_{PA} \rfloor$ bits corresponding to the preamble index i=24 is 011000. If the first bitstream 1210, the second bitstream 1220, and the third bitstream 1230 are arranged, the base station may decode message bits of 010001000011000111011000. The base station may acquire message information that includes a prefix, a terminal ID, and a desired message from the message bit.

Figure 13:
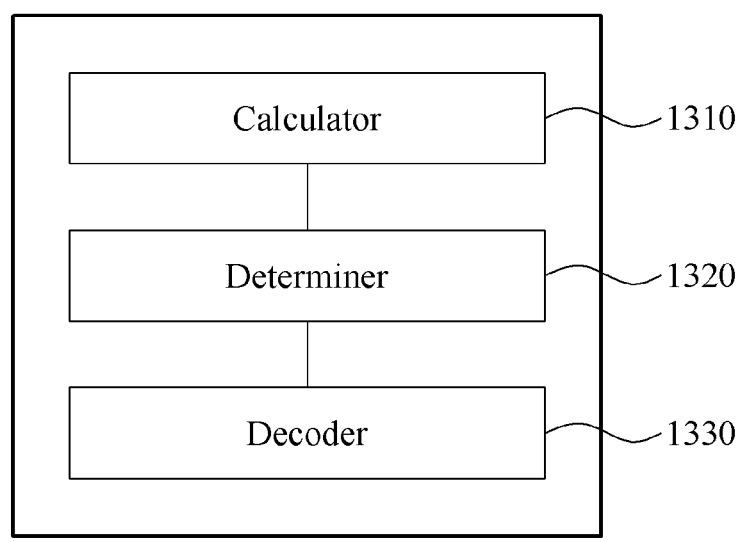
FIG. 13 is a block diagram illustrating a base station according to another example embodiment.

FIG. 13 is a block diagram illustrating a base station according to another example embodiment. Referring to FIG. 13, a base station 1300 may include a processor and may perform a random access with a terminal. In addition, the base station 1300 may be at least temporarily embodied by the processor.

The base station 1300 may include a calculator 1310, a determiner 1320, and a decoder 1330. The calculator 1310 may calculate a received preamble index i based on a sequence received from the terminal and a Zadoff-Chu sequence associated with a preamble. In detail, the calculator 1310 may calculate the preamble index i by calculating a correlation value between the received sequence and a first Zadoff-Chu sequence associated with a preamble root index r. The calculator 1310 may determine a preamble detection region in which a location number of the correlation value is present and may calculate the preamble index i.

In addition, the calculator 1310 may calculate a message root index k that is determined based on the preamble index i, using a message index function. In the random access method, in response that the terminal that performs a predetermined communication scheme to simultaneously transmit the preamble and the message, the base station may determine whether a collision between preambles used by a plurality of terminals using the number of detected message indices is present in a first step of the random access method. In detail, the determiner 1320 may determine whether a preamble collision is present based on a second Zadoff-Chu sequence associated with a message root index k that is determined based on the preamble index i. According to the example embodiment, the base station may transmit in advance information of the message root index k corresponding to preamble index i as random access priori information.

The determiner 1320 may calculate a correlation value between the received sequence and the second Zadoff-Chu sequence associated with the message root index k. When at least two peaks of the correlation value exceed a preset threshold, the determiner 1320 may determine that the preamble collision is present between the plurality of terminals. In detail, when a location number corresponding to a peak of a correlation value exceeding the threshold is detected from a region corresponding to at least two message indices, the determiner 1320 may determine that the preamble collision is present. When the preamble collision is determined to be present, the base station 1300 may terminate the corresponding random access procedure by not transmitting a random access response message to the terminal. The terminal may verify that the random access response message corresponding to the sequence transmitted from the terminal is not received, and may determine that a collision has occurred in the transmitted preamble.

As described above, a scheme of detecting a preamble index or a message index according to the related art determines a region in which a location number corresponding to a peak of a correlation value is present. Here, in the case of the preamble index, due to an insufficient region size corresponding to each single preamble index, the base station may not determine whether a plurality of peaks is detected due to a multipath of the same terminal or whether a preamble collision has occurred between the plurality of terminals. According to the example embodiment, by detecting the message index capable of having a relatively wider region compared to a region in which a peak value associated with a preamble is detected, it is possible to further accurately detect the number of terminals having the same preamble.

When the determiner 1320 determines that the preamble collision is absent, the calculator 1310 may calculate the message index based on the received sequence and the Zadoff-Chu sequence associated with the message root index. The description associated with the calculator 1010 and the detector 1020 may be applicable to the above operation.

The decoder 1330 may decode the message transmitted from the terminal through the random access procedure based on the preamble index i and a message index l calculated by the calculator 1310. Likewise, the description associated with the decoder 1030 may be applicable to the operation of the decoder 1330.

Figure 14A:
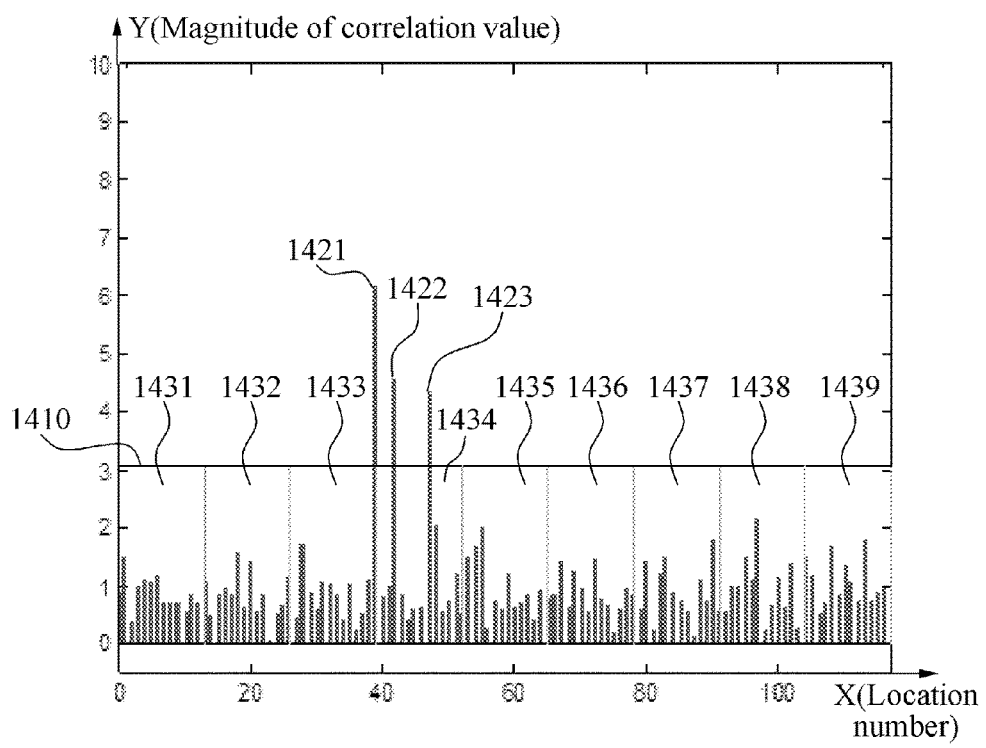
FIGS. 14A and 14B are graphs showing a process of detecting a preamble collision according to an example embodiment.
Figure 14B:
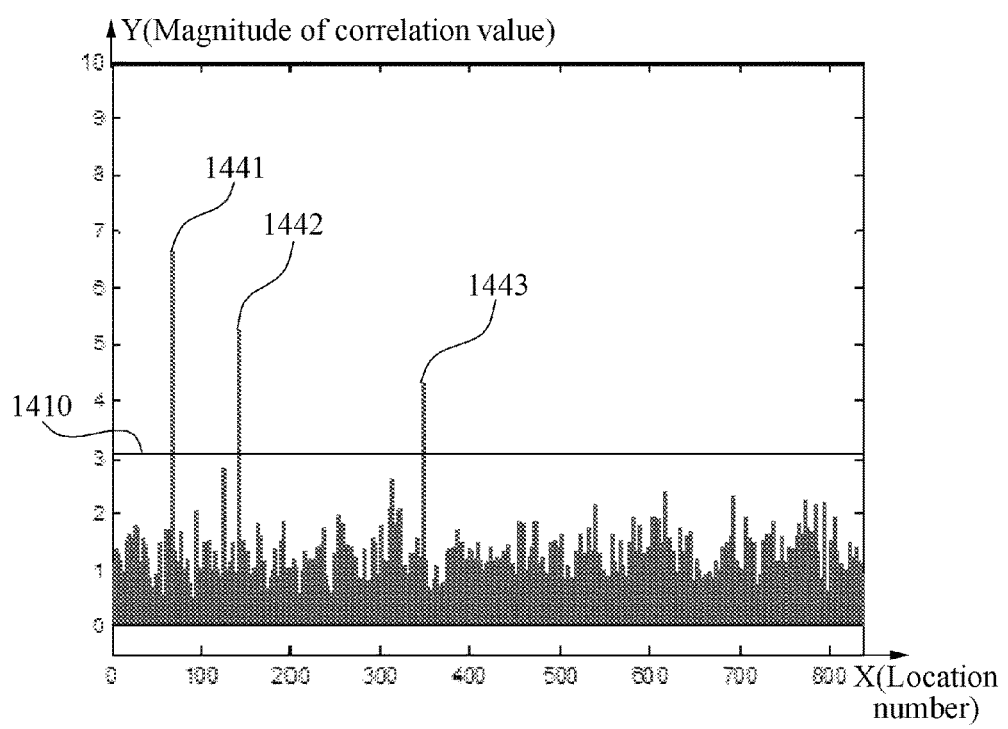

FIGS. 14A and 14B are graphs showing a process of detecting a preamble collision according to an example embodiment. X axis denotes a location number of a correlation value and Y axis denotes a magnitude of the calculated correlation value. In the example embodiment, it is assumed that different three terminals have attempted random access to a base station using the same preamble index and a preamble collision has occurred.

The base station may calculate a first correlation value between a received sequence and a Zadoff-Chu sequence associated with a preamble root index r. The base station may calculate the first correlation value according to Equation 8. In addition, the base station may detect a location number having a correlation value greater than or equal to a threshold 1410 as a location number having a peak value. Referring to FIG. 14A, the base station may detect a location number corresponding to three peaks 1421, 1422, and 1423. In addition, the base station may determine a region in which the location number corresponding to the three peaks 1421, 1422, and 1423 is present. According to the example embodiment, FIG. 14A illustrates nine regions 1431, 1432, 1433, 1434, 1435, 1436, 1437, 1438, and 1439 starting from the first region 1431 corresponding to a first preamble index 0 to the ninth region 1439 corresponding to a ninth preamble index 8. Referring to FIG. 14A, the base station may determine that the location number corresponding to the three peaks 1421, 1422, and 1423 is present in a fourth region 1434 corresponding to a fourth preamble index 3. Here, the base station may not verify whether a preamble collision is present only based on that the three peaks 1421, 1422, and 1423 are detected in the region corresponding to the same preamble index. A plurality of peaks may be generated in a sequence transmitted from a single terminal due to, for example, a multipath of the same terminal and the like. Accordingly, the base station may calculate a corresponding message root index by substituting a message root index function with the detected preamble index 3.

For example, herein, it is assumed that f(3)=5 and the calculated message root index is 5. The base station may calculate a second correlation value based on a sequence received the calculated message root index 5 and a Zadoff-Chu sequence associated with the message root index 5. The base station may calculate the second correlation value according to Equation 9. The base station may determine the number of peaks of the second correlation value in a region corresponding to the entire Zadoff-Chu sequence. As described above with FIG. 14A, the base station may detect the location number having the correlation value greater than or equal to the preset threshold 1410 as the location number having the peak value. The base station may detect three peaks 1441, 1442, and 1443 as peaks corresponding to the message index. Accordingly, the base station may detect that the preamble index 3 collided due to three terminals. The base station may terminate a corresponding random access procedure by not transmitting a random access response message to the three terminals.

Figure 15:
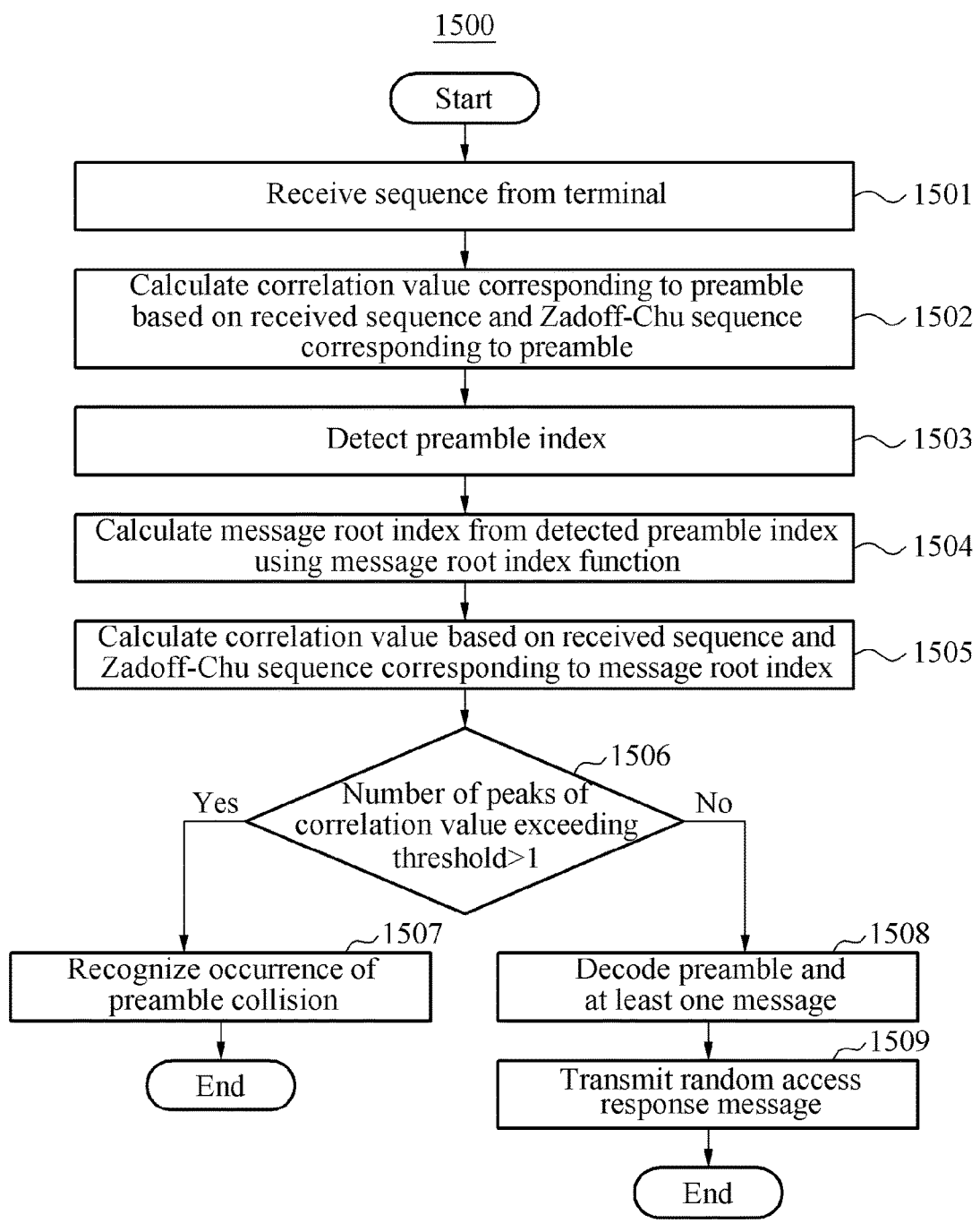
FIG. 15 is a flowchart illustrating a method of detecting, at a base station, a preamble collision using a sequence transmitted from a terminal in a random access procedure according to an example embodiment.

FIG. 15 is a flowchart illustrating a method 1500 of detecting, at a base station, a preamble collision using a sequence transmitted from a terminal in a random access procedure according to an example embodiment. Operation 1501 is an operation of receiving, at the base station, a sequence from the terminal. For example, in operation 1501, the base station may simultaneously receive sequences from a plurality of terminals.

Operation 1502 is an operation of calculating a correlation value corresponding to a preamble based on the received sequence and a Zadoff-Chu sequence corresponding to the preamble. For example, operation 1502 may be performed by the calculator 1310 of the base station 1300 of FIG. 13. Also, operation 1502 may be performed using Equation 8. In addition, although the base station receives the sequence from the plurality of terminals in operation 1501, the plurality of terminals may use the same preamble root index and the base station may calculate a correlation value corresponding to a single preamble.

Operation 1503 is an operation of detecting a preamble index. In operation 1503, the base station detects a peak location of the correlation value corresponding to the preamble and detects a location number corresponding to the peak location. The location number may be calculated as $N_{CS} \times i + t_j$ according to Equation 8. In operation 1503, the base station may determine a preamble detection region that includes the location number corresponding to a peak of the correlation value corresponding to the preamble, and may calculate a preamble index i. For example, the preamble index i may be detected from a region greater than or equal to $\tau = N_{CS} \times (i-1)$ and less than or equal to $\tau = N_{CS} \times i - 1$ corresponding to a detection region as described with Equation 8. In operation 1503, the base station may detect the preamble index i.

Operation 1504 is an operation of calculating a message root index k at the base station. In detail, in operation 1504, the base station may calculate the message root index k corresponding to the detected preamble index i using a message root index function. For example, operation 1504 may be performed by the calculator 1310 of the base station 1300.

According to another example embodiment, in the case of a simultaneous random access between the base station and at least one terminal, the base station may set a plurality of message root index function sets. For example, when there is a need to prevent a message transmitted and received from being decoded using a conventional communication method due to security issues, the example embodiment may be required. Prior to performing the random access procedure, the base station may match a specific message root index function set to a specific terminal and may transmit a message to the specific terminal. In operation 1504, the base station may calculate the specific message root index set corresponding to the specific terminal.

Operation 1505 is an operation of calculating a correlation value based on the received sequence and a Zadoff-Chu sequence corresponding to the message root index k. Operation 1505 may be performed using Equation 9.

According to another example embodiment, when the base station sets a plurality of message root index function sets, the base station may calculate a Zadoff-Chu sequence corresponding to each message root index of the specific message root index set in operation 1505. For example, when the message root index set includes N elements, the base station may calculate a Zadoff-Chu sequence corresponding to a first message root index to a Zadoff-Chu sequence corresponding to an $N^{th}$ message root index in operation 1505. In addition, the base station may calculate a correlation value corresponding to each Zadoff-Chu sequence.

In operation 1506, the base station may compare a peak of the correlation value corresponding to the message root index k to a preset threshold, and may determine whether at least two peaks of the correlation value exceed the threshold.

When it is determined that at least two peaks of the correlation value exceed the threshold in operation 1506, the base station may recognize an occurrence of a preamble collision between the plurality of terminals in operation 1507 and may terminate the corresponding random access procedure.

Here, when it is determined that a single peak of the correlation value exceeds the threshold in operation 1506, the base station may determine that the preamble collision has not occurred. Accordingly, the base station may perform operation 1508 of decoding the preamble and at least one message and operation 1509 of transmitting a random access response message.

Figure 16:
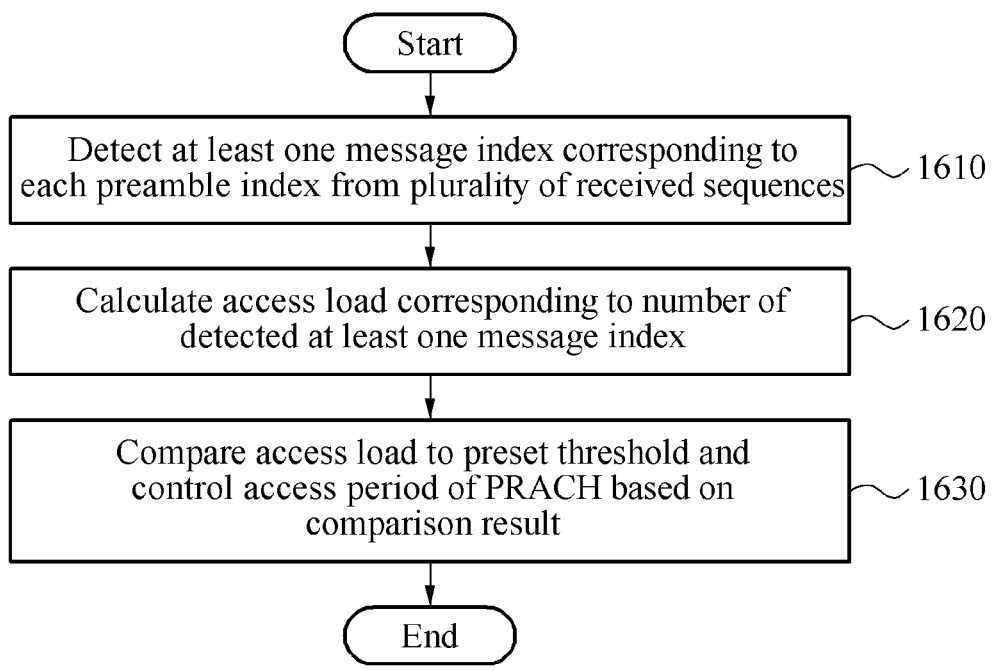
FIG. 16 is a flowchart illustrating a communication method of a base station that controls access load using a detected message index according to an example embodiment.

FIG. 16 is a flowchart illustrating a communication method of a base station that controls access load using a detected message index according to an example embodiment. A communication method 1600 of the base station may include operation 1610 of detecting at least one message index corresponding to each preamble index from a plurality of received sequences, operation 1620 of calculating access load corresponding to the number of the detected at least one message index, and operation 1630 of comparing the access load to a preset threshold and controlling an access period of a PRACH based on the comparison result.

In operation 1610, the base station may calculate a corresponding message root index using each preamble index used for a random access procedure. In addition, in operation 1610, the base station may detect the number of message indices received from the plurality of terminals using a Zadoff-Chu sequence corresponding to each message root index.

In operation 1620, the base station may calculate the number of message indices corresponding to a single preamble index and may store a calculation result. In addition, the base station may calculate an average number of message indices detected from the current random access procedure. The base station may determine the access load corresponding to the current random access procedure based on the number of message indices.

In operation 1630, the base station may compare the access load to a preset threshold, and may control the access period of the PRACH based on the comparison result. Operation 1630 may include an operation of setting $T_{RACH}$ corresponding to the access period to further increase if the access load is less than the threshold and setting $T_{RACH}$ corresponding to the access period to further decrease if the access load is greater than the threshold. When new $T_{RACH}$ is set in operation 1630, the base station may broadcast corresponding content to each of the terminals as random access priori information.

Figure 17:
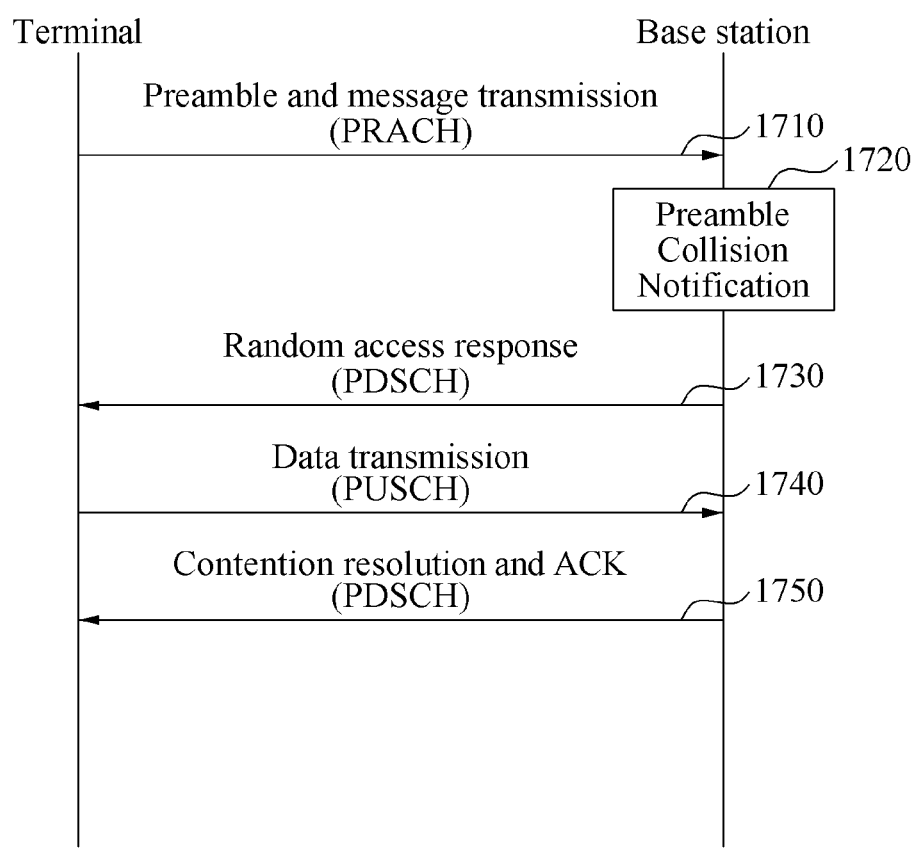
FIG. 17 illustrates a random access procedure between a terminal and a base station according to an example embodiment.

FIG. 17 illustrates a random access procedure between a terminal and a base station according to an example embodiment.

Referring to FIG. 17, in operation 1710, the terminal may encode a preamble and a message and may transmit the encoded preamble and message to the base station using a PRACH. In detail, the terminal may transmit, to the base station, a transmission sequence that includes the preamble and the message. The terminal may select a preamble corresponding to a predetermined communication scheme with the base station. In detail, if a Zadoff-Chu sequence length $N_{ZC}$ and a preamble cyclic shift size $N_{cs}$ are given, the terminal may determine the number $N_{PA}$ of preamble sequences transmittable from the terminal to the base station according to Equation 1.

According to an example embodiment, a predetermined natural number K among the entire available $N_{PA}$ preambles may be predetermined to be used at a fixed terminal. Also, a predetermined natural number L among the entire available $N_{PA}$ preambles may be predetermined to be used at a mobile terminal.

According to another example embodiment, in operation 1710, a fixed terminal among terminals may encode a preamble generated using a preamble root index $r_{fix}$ and may transmit the encoded preamble to the base station. Also, in operation 1710, a mobile terminal among the terminals may encode a preamble generated using a preamble root index $r_{mob}$ and may transmit the encoded preamble to the base station.

A relationship between a property of the Zadoff-Chu sequence used for the random access process and the preamble root index r and the preamble index i is straightforward to one of ordinary skill in the art and thus, a further detailed description is omitted.

In addition, in operation 1710, the terminal may set a message root index function set $\{k_1=f_1(i), k_2=f_2(i), \ldots, k_N=f_N(i)\}$ for transmitting a message through a PRACH. In detail, the terminal may set a message root index set defined as the preamble index i. Also, the preamble root index r and element k of the message root index set may be set to have different values to use cross-correlation of the Zadoff-Chu sequence. In this case, the number of message bits transmittable using a PRACH may be determined according to Equation 2.

In Equation 2, a natural number N may denote the number of elements included in the message root index function set. When there is a need to transmit a message increased to be greater than a Zadoff-Chu sequence length corresponding to a predetermined communication scheme as in an LTE standard, the terminal may determine that the increased message is to be transmitted using a plurality of subframes corresponding to a random access channel. For example, in the existing LTE standard, the Zadoff-Chu sequence with the length of $N_{zc}=839$ was transmitted by setting 1 ms subframe as a time axis length of the PRACH. In this case, to transmit the Zadoff-Chu sequence with the increased length ($N_{zc}>839$), the time axis length of the PRACH may be configured using the plurality of subframes.

For example, if N is assumed to be 1 without being limited, $\lfloor \log_2 N_{PA} \rfloor$ bits corresponding to a first bitstream of the transmission sequence may denote the preamble index i. Also, $\lfloor \log_2 N_{ZC} \rfloor$ bits corresponding to a second bitstream of the transmission sequence may denote a message index l.

According to an example embodiment, when the fixed terminal and the mobile terminal are identified using the preamble index i, the terminal may transmit a message using $\lfloor \log_2 N_{ZC} \rfloor$ bits corresponding to the message index l within the transmission sequence in operation 1710.

According to another example embodiment, when the fixed terminal uses a preamble root index $r_{fix}$ and the mobile terminal uses a preamble root index $r_{mob}$, the terminal may transmit a message using the entire $\lfloor \log_2 N_{PA} \rfloor + \lfloor \log_2 N_{ZC} \rfloor$ bits corresponding to the preamble index i and the message index l within the transmission sequence in operation 1710.

In operation 1720, the base station may detect a preamble index using the received sequence. In addition, the base station may additionally detect a message index using the received sequence.

In operation 1720, the base station may identify a terminal associated with the preamble as the fixed terminal or the mobile terminal based on the decoded preamble index.

Also, in operation 1720, the base station may determine an occurrence of the preamble collision based on the number of detected message indices. In detail, when a plurality of message indices is detected, the base station may determine that the plurality of terminals uses the same preamble and may detect the occurrence of the preamble collision.

In operation 1730, the base station may generate a random access response message and may transmit the generated random access response message to the terminal based on a type of the identified terminal and the occurrence of the preamble collision. In detail, the random access response message may include at least one of the detected preamble index, timing alignment information, and uplink resource grant information.

In operation 1740, the terminal may transmit data using a PUSCH assigned from the base station. In operation 1750, the base station may receive, from the terminal, data that includes a desired message and a terminal ID. In addition, the base station may transmit ACK for the data to the terminal. The transmission may be performed through a PDSCH. Also, in operation 1750, the base station may transmit a contention resolution message to the terminal.

According to the example embodiment, although the same preamble is received and a collision occurs with respect to the preamble transmitted from the terminal, the base station may transmit a random access response message to the terminal. In detail, when a collision occurs between fixed terminals aware of timing alignment information, the base station may pair the fixed terminals and may assign the same uplink resource to the paired fixed terminals. In detail, the fixed terminals may denote two different fixed terminals. In this case, although the preamble collision occurs, the fixed terminals may attempt a data transmission by sharing the uplink resource. Accordingly, it is possible to further efficiently use radio resources. Hereinafter, an operation of the base station will be further described with reference to the following additional drawings.

Figure 18:
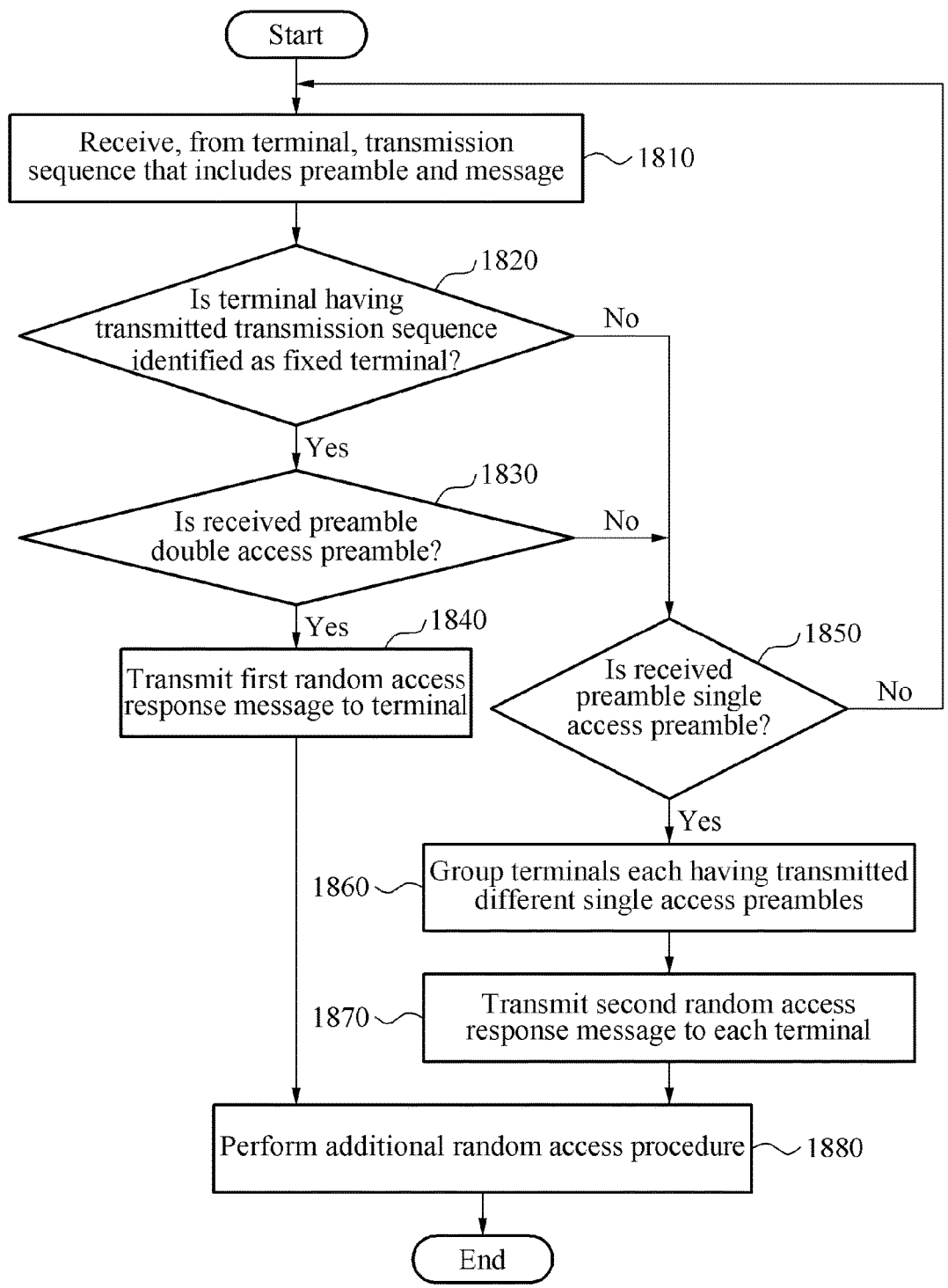
FIG. 18 is a flowchart illustrating a random access procedure of a base station according to another example embodiment.

FIG. 18 is a flowchart illustrating a random access procedure of a base station according to an example embodiment.

In operation 1810, the base station may receive, from a terminal, a transmission sequence that includes a preamble and a message. The description associated with operation 1710 of FIG. 17 may be applicable to operation 1810.

In operation 1820, the base station may identify the terminal having transmitted the transmission sequence as a fixed terminal or a mobile terminal. According to an example embodiment, the base station may calculate a first correlation value between the received transmission sequence and a Zadoff-Chu sequence associated with a preamble root index r. In addition, the base station may detect a location number having a correlation value greater than or equal to a preset threshold as a location number corresponding to a peak value. The base station may identify the terminal having transmitted the transmission sequence as the fixed terminal or the mobile terminal based on a region in which the location number is present. For example, when a value of the preamble index is detected to be greater than or equal to 1 and less than or equal to natural number K, the base station may identify the terminal as a fixed terminal. In addition, when the value of the preamble index is detected to be greater than or equal to K+1 and less than or equal to the number $N_{PA}$ of preamble sequences, the base station may identify the terminal as a mobile terminal. The above example embodiment is provided as an example only and should not be interpreted to limit or restrict the scope of other example embodiments. For example, the natural number K may be variously modified.

According to another example embodiment, the base station may calculate a second correlation value between the received transmission sequence and a Zadoff-Chu sequence corresponding to one of a first preamble root index $r_{fix}$ and a second preamble root index $r_{mob}$. In addition, the base station may calculate a preamble root index to detect a peak value having a correlation value greater than or equal to a preset threshold. The base station may identify the terminal having transmitted the transmission sequence as a fixed terminal or a mobile terminal based on the calculation result.

For example, when a peak value is detected from the second correlation value between the transmission sequence and the Zadoff-Chu sequence associated with the first preamble root index $r_{fix}$, the base station may identify the terminal as a fixed terminal. As another example, when a peak value is detected from the second correlation value between the transmission sequence and the Zadoff-Chu sequence associated with the second preamble root index $r_{mob}$, the base station may identify the terminal as a mobile terminal.

When the terminal having transmitted the transmission sequence is identified as the fixed terminal, the base station may perform operation 1830. In operation 1830, the base station may determine whether the preamble index transmitted from the terminal is a double access preamble. Here, the double access preamble may represent a case in which a collision has occurred due to the same preamble index transmitted from two different terminals.

In detail, in operation 1830, the base station may calculate the number of preamble indices received using a message root index k. The message root index k may be an index defined as k=f(i) based on the preamble index i. In addition, the preamble root index r and the message root index k may be set as different values to use cross-correlation of the Zadoff-Chu sequence. In operation 1830, the base station may calculate a third correlation value based on the transmission sequence and the Zadoff-Chu sequence associated with the message root index k. The base station may determine the number of peaks of the third correlation value in a region corresponding to the entire Zadoff-Chu sequence. The region corresponding to the message root index k may include a large number of location numbers compared to a region corresponding to the preamble root index r, and a peak value distribution may be calculated in a further wide region. The base station may determine the number of collision occurrences that the same preamble is received based on the number of peaks. For example, when two peaks are present, the base station may determine that the received preamble is the double access preamble. When the peak is one, the base station may determine that the received preamble is a single access preamble.

When the preamble included in the received transmission sequence is determined as the double access preamble in operation 1830, the base station may perform operation 1840. In operation 1840, the base station may generate a first random access response message and may transmit the generated first random access response message to the terminal. The base station may pair two fixed terminals having transmitted the same preamble index, and may transmit the first random access response message to each of the two fixed terminals. The first random access response message may include location information of an uplink resource and the detected preamble index. In addition, the first random access response message may include timing alignment information corresponding to a relatively small value between two pieces of timing alignment information of the received two double access preambles. That is, the base station may encode timing alignment information associated with a fixed terminal close to the base station to the first random access response message, and may transmit the generated first random access response message to the two fixed terminals.

In the case of a fixed terminal of which a location is fixed, a distance from the base station to the fixed terminal may also be fixed. Accordingly, each fixed terminal may be aware of timing alignment information of the fixed terminal and may determine whether a collision has occurred in the preamble transmitted from the fixed terminal and may determine whether the preamble transmitted from the fixed terminal is the double access preamble based on the received first random access response message. According to the example embodiment, although the preamble collision occurs due to the same preamble transmitted from the two different fixed terminals, the random access procedure may be continuously performed.

When it is determined that the preamble included in the received transmission sequence is not the double access preamble in operation 1830, the base station may perform operation 1850. In addition, when the terminal having transmitted the transmission sequence is identified as the mobile terminal in operation 1820, the base station may perform operation 1850. In operation 1850, the base station may determine whether the preamble index transmitted from the terminal is a single access preamble. The description associated with operation 1830 may be applicable to operation 1850. The base station may determine whether the number of received preamble indices is one based on the message root index k. Further description related thereto is already made above and thus, a repeated description is omitted here.

When it is determined that the preamble included in the received transmission sequence is not a single access preamble in operation 1850, the base station may perform back-off and may newly proceed with a subsequent random access procedure. That is, when at least three same preambles are received from the fixed terminal, the base station may perform back-off and may newly perform a subsequent random access procedure. Also, when at least two same preambles are received from the mobile terminal, the base station may perform back-off and may newly perform a subsequent random access procedure.

When the preamble included in the received transmission sequence is determined as a single access preamble in operation 1850, the base station may perform operation 1860. In operation 1860, the base station may group the respective terminals having transmitted different single access preambles.

In operation 1870, the base station may assign the same uplink resource to each of the grouped terminals. For example, in operation 1870, the base station may generate a second random access response message that includes an index of a single access preamble transmitted from a first terminal, timing alignment information of the first terminal, and location information of a shared uplink resource, and may transmit the generated second random access response message to the terminal. In detail, when different M terminals are grouped, the base station may generate different M random access response message corresponding to the respective terminals. Each terminal may receive the second random access response message corresponding to the terminal. Here, the uplink resource included in the second random access response message may be shared with other grouped terminals and reused.

When operation 1840 or operation 1870 is performed, the base station may perform operation 1880 of performing an additional random access procedure. In operation 1880, the base station may receive a message from the terminal through an uplink resource. In addition, the base station may perform decoding using a successive interference cancellation (SIC) scheme. The SIC scheme represents a technology for processing a signal using a difference in signal intensity between received signals. That is, the base station may decode each of a plurality of messages transmitted through a single uplink resource by first decoding a robust signal, by initially extracting the robust signal from an overlapping signal, and by cancelling a weak signal from a remaining signal. The SIC scheme is straight-forward to one of ordinary skill in the art and thus, a further description related thereto is omitted.

Figure 19:
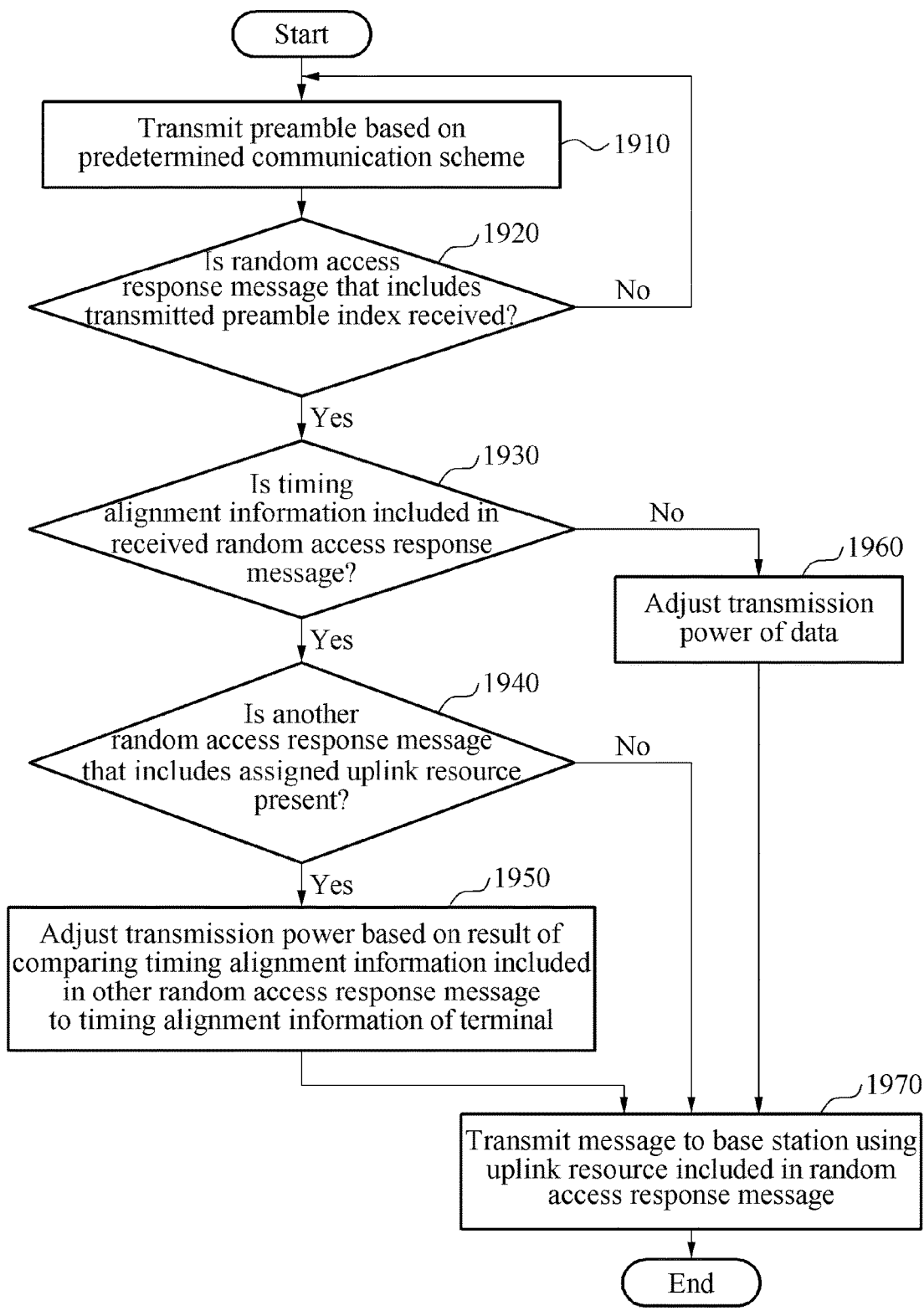
FIG. 19 is a flowchart illustrating a random access procedure of a terminal according to an example embodiment.

FIG. 19 is a flowchart illustrating a random access procedure of a terminal according to an example embodiment.

FIG. 19 is a flowchart illustrating a random access procedure performed between a fixed terminal and a base station. Referring to FIG. 19, in operation 1910, the terminal may transmit a preamble to the base station based on a predetermined communication scheme. For example, the terminal may transmit a preamble index within a predetermined range among the number $N_{PA}$ of transmittable preamble sequences to the base station. As another example, the terminal may transmit, to the base station, a preamble generated using a predetermined preamble root index $r_{fix}$.

In operation 1920, the terminal may determine whether a random access response message that includes the preamble index transmitted from the terminal is received. When it is determined that the random access response message that includes the preamble index transmitted from the terminal is not received in operation 1920, the terminal may perform back-off and may perform a new random access procedure.

When it is determined that the random access response message that includes the preamble index transmitted from the terminal is received in operation 1920, the terminal may perform operation 1930. In operation 1930, the terminal may determine whether timing alignment information of the terminal is included in the received random access response message. In the example embodiment, the terminal may represent a node that communicates with the base station at a fixed location. In this case, a physical distance between the terminal and the base station may be represented using a fixed value and the terminal may be aware of timing alignment information of the terminal within a preset range. Accordingly, the terminal may verify whether a collision has occurred in the preamble transmitted from the terminal and whether an uplink resource is shared with other terminals and used by verifying timing alignment information from the received random access response message.

When it is determined that the timing alignment information associated with the terminals is included in the random access response message in operation 1930, the terminal may perform operation 1940. The terminal may determine whether another random access response message that includes the uplink resource assigned to the terminal is present in operation 1940.

When it is determined that the other random access response message that includes the assigned uplink resource grant is present in operation 1940, the terminal may perform operation 1950. In operation 1950, the terminal may compare timing alignment information included in the other random access response message to the timing alignment information associated with the terminal. In addition, the terminal may adjust transmission power of data to be changed by a predetermined magnitude compared to a predetermined reference power based on the comparison result. Hereinafter, a configuration in which the terminal compares the timing alignment information included in another random access message and the timing alignment information associated with the terminal and adjusts the transmission power will be further described with reference to the following additional drawings.

When it is determined that the timing alignment information associated with the terminal is not included in the random access response message in operation 1930, the terminal may perform operation 1960. In detail, the timing alignment information included in the received random access response message may indicate the timing alignment information of another terminal of which a distance from the base station is less than the distance between the base station and the terminal. The terminal may verify that not the timing alignment information associated with the terminal but the other timing alignment information is included in the random access response message and may determine that the currently transmitted preamble is a double access preamble. Accordingly, the terminal may adjust the transmission power of data to be changed by a predetermined magnitude compared to a predetermined reference power. A configuration in which the terminal adjusts the transmission power of data will be further described with reference to the following additional drawings.

When it is determined that the other random access response message including the uplink resource assigned to the terminal is absent in operation 1940, or when operation 1950 or operation 1960 is performed, the terminal may perform operation 1970 of transmitting a message to the base station based on location information of the uplink resource included in the random access response message. In the example embodiment, although two different terminals transmit the same preamble, each terminal may transmit a message to the base station based on a scheme of adjusting the corresponding transmission power. Accordingly, radio resources may be further efficiently used.

Figure 20:
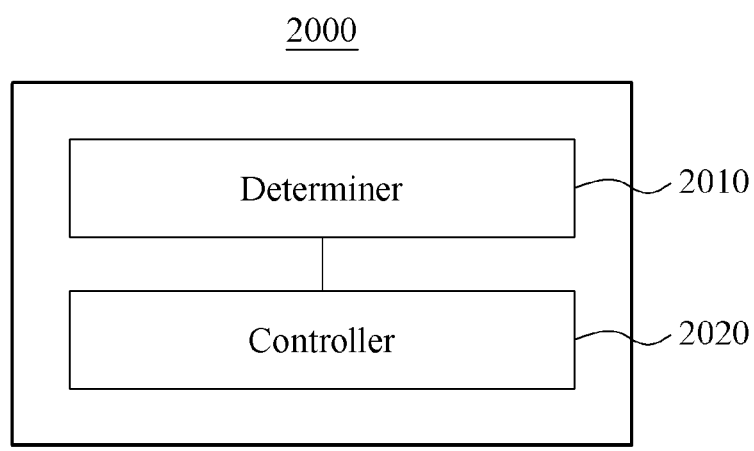
FIG. 20 is a block diagram illustrating a terminal according to another example embodiment.

FIG. 20 is a block diagram illustrating a terminal according to an example embodiment.

Referring to FIG. 20, a terminal 2000 may include a determiner 2010 and a controller 2020. In addition, the terminal 2000 may include at least one processor and may be at least temporarily embodied by the at least one processor. The determiner 2010 may determine whether a preamble index transmitted from the terminal 2000 is included in the received random access response message. Also, the determiner 2010 may determine whether timing alignment information associated with the terminal 2000 is included in the received random access response message. The description associated with operation 1920 and operation 1930 may be applicable to an operation of the determiner 2010 and a further description is omitted.

The controller 2020 may adjust a transmission power of data transmitted using an uplink resource based on the determination result of the determiner 2010. The uplink resource may represent an uplink resource included in the received random access response message.

According to an example embodiment, when it is determined that a preamble transmitted from the terminal 2000 and timing alignment information associated with the terminal 2000 are included in the received random access response message, the controller 2020 may transmit data to the base station using a predetermined reference power. The predetermined reference power may represent a power value corresponding to an LTE standard.

According to another example embodiment, when it is determined that the preamble transmitted from the terminal 2000 is included in the received random access response message and the timing alignment information associated with the terminal 2000 is not included in the received random access response message, the controller 2020 may transmit data using the power changed by a predetermined magnitude compared to a predetermined reference power. Here, a signal to noise ratio (SNR) of the terminal corresponding to a predetermined communication scheme is assumed as $\xi_A$. In this case, the SNR $\xi_A$ of the terminal 2000 may be calculated according to Equation 11.

$$\xi_A = E[H_A] P_{ref,A} r_A^{-\alpha} / N_0 \quad \text{[Equation 11]}$$

In Equation 11, $E[H_A]$ denotes expected channel gain of the terminal 2000 and $P_{ref,A}$ denotes the predetermined reference power of the terminal 2000. In addition, $r_A$ denotes a distance between the base station and the terminal 2000, $\alpha$ denotes a path loss coefficient, and $N_0$ denotes noise power. The controller 2020 may adjust the power at which the terminal 2000 transmits data based on $P_A$ as expressed in Equation 12.

$$P_A = P_{ref,A} \times 10^{\left(\frac{x}{10}\right)} \quad \text{[Equation 12]}$$

For example, the controller 2020 may transmit the transmission power of data transmitted from the terminal 2000 by x dB compared to the reference power $P_{ref,A}$. For example, x dB may be set as 3 dB. Here, it is assumed that another terminal having received the same random access response message as one received at the terminal 2000 transmits a message based on the reference power. The base station may initially decode a message received from terminal 2000 and subsequently transmit the message with the reference power and may decode a message from another terminal at a transmission power less than that of the terminal 2000 based on an SIC scheme. The example embodiment of increasing the transmission power of data transmitted from the terminal 2000 by x dB compared to the reference power $P_{ref,A}$ is described herein However, it is not construed to limit or restrict other example embodiments. To use the SIC scheme, an example embodiment of decreasing the transmission power of data transmitted from the terminal 2000 by x dB compared to the reference power $P_{ref,A}$ may be applicable.

According to another example embodiment, when it is determined that the preamble transmitted from the terminal 2000 and timing alignment information associated with the terminal 2000 are included in the received random access response message, and that other random access response messages, each including the same uplink resource as one assigned to the terminal 2000, are received, the determiner 2010 may compare each of a plurality of items of timing alignment information included in the other random access response messages to the timing alignment information associated with the terminal 2000. The controller 2020 may calculate the number of pieces of timing alignment information having a value greater than the timing alignment information associated with the terminal 2000.

According to the example embodiment, a case in which the terminal 2000 transmits a collision-free single access preamble to the base station may be described. For example, it is assumed that the same uplink resource as that of the terminal 2000 is assigned to a first terminal and a second terminal. When first timing alignment information associated with the first terminal and second timing alignment information associated with the second terminal are greater than the timing alignment information associated with the terminal 2000, the terminal 2000 may adjust power $P_A$ for transmitting data according to Equation 13.

$$P_A = P_{ref,A} \times 10^{\left(\frac{2x}{10}\right)} \quad \text{[Equation 13]}$$

When the timing alignment information of the terminal 2000 is less than that of the other terminal, the terminal 2000 may determine that a distance between the terminal 2000 and the base station is less than a distance between the other terminal and the base station. Accordingly, the terminal 2000 may adjust the transmission power of the terminal 2000 to increase so that data of the terminal 200 relatively close the base station may be preferentially decoded. The example embodiment of increasing the transmission power by 2x dB compared to the reference power is not construed to limit or restrict the scope of other example embodiments. An example embodiment of decreasing the transmission power by 2x dB compared to the reference power is also applicable.

Figure 21:
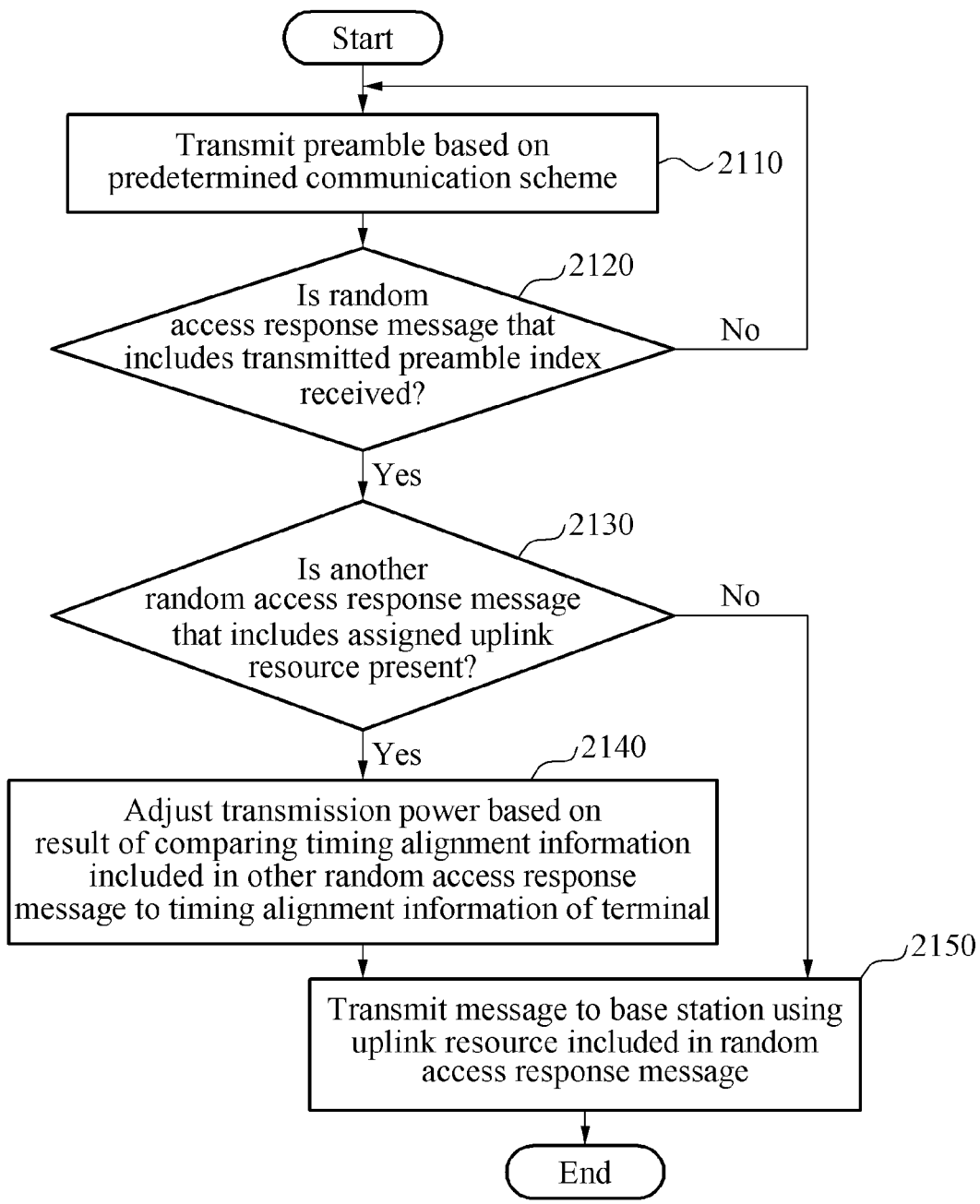
FIG. 21 is a flowchart illustrating a random access procedure of a terminal according to another example embodiment.

FIG. 21 is a flowchart illustrating a random access procedure of a terminal according to another example embodiment.

FIG. 21 is a flowchart illustrating a random access procedure performed between a mobile terminal and a base station. Referring to FIG. 21, in operation 2110, the terminal may transmit a preamble to the base station based on a predetermined communication scheme. For example, the terminal may transmit a preamble within a predetermined range among the number $N_{PA}$ of transmittable preamble sequences to the base station. As another example, the terminal may transmit, to the base station, the preamble generated using a predetermined preamble root index $r_{mob}$.

In operation 2120, the terminal may determine whether a random access response message that includes a preamble index transmitted from the terminal is received. The description associated with operation 1920 may be applicable to operation 2120 and further description is omitted.

When it is determined that the access response message that includes the preamble index transmitted from the terminal is received in operation 2120, the terminal may perform operation 2130. In operation 2130, the terminal may determine whether another random access response message that includes the same uplink resource as one assigned to the terminal is present.

When it is determined that the other random access response message that includes the same uplink resource as one assigned to the terminal is present in operation 2130, the terminal may perform operation 2140. In operation 2140, the terminal may compare timing alignment information included in the other random access response message to timing alignment information associated with the terminal. In addition, the terminal may adjust a transmission power of data to be changed by a predetermined magnitude compared to a predetermined reference power based on the comparison result. The description associated with the controller 2020 may be applicable to a process in which the terminal adjusts the transmission power of data in operation 2140 and thus, a further description is omitted.

When operation 2140 is performed, or when it is determined that the other random access response message that includes the same uplink resource as one assigned to the terminal is absent in operation 2130, the terminal may perform operation 2150 of transmitting a message to the base station using the uplink resource included in the random access response message.

Figure 22:
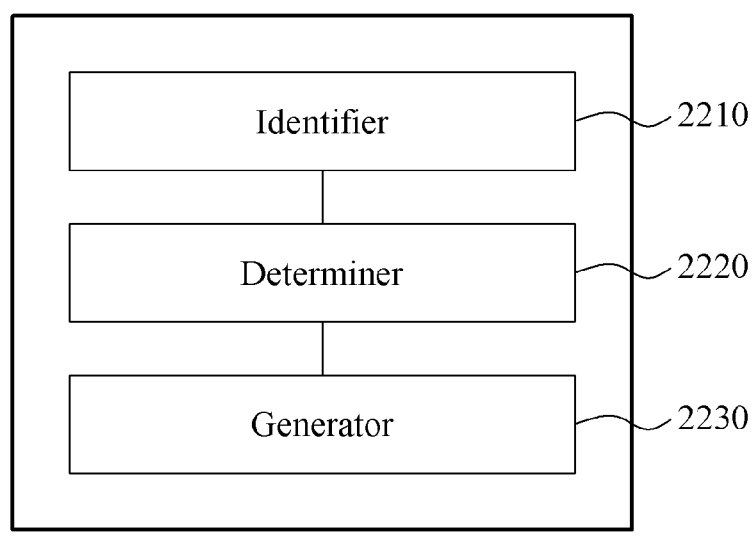
FIG. 22 is a block diagram illustrating a base station according to another example embodiment.

FIG. 22 is a block diagram illustrating a base station according to an example embodiment.

Referring to FIG. 22, a base station 2200 may include an identifier 2210, a determiner 2220, and a generator 2230. The identifier 2210 may identify a terminal associated with a received preamble as a fixed terminal or a mobile terminal using the received terminal.

For example, the identifier 2210 may identify the terminal as the fixed terminal or the mobile terminal based on an index size of a decoded preamble.

As another example, the identifier 2210 may identify the terminal as the fixed terminal or the mobile terminal based on a root index used for decoding the preamble.

The determiner 2220 may determine the number of times that a preamble having the same value as an index associated with the preamble is received. In detail, the determiner 2220 may determine the number of times that a preamble having the same value is received using a message root index defined based on the preamble index and a Zadoff-Chu sequence. In detail, the determiner 2220 may calculate a correlation value between the received sequence and the Zadoff-Chu sequence associated with the message root index, and may determine the number of times that the preamble having the same value is received based on the number of peaks exceeding a threshold in a graph of the correlation value.

The generator 2230 may generate a random access response message based on the identification result of the identifier 2210 and the determination result of the determiner 2220.

According to an example embodiment, when the terminal is identified as the fixed terminal and it is determined that two preambles having the same value as the index are received, the generator 2230 may generate the random access response message that includes the index, location information of an uplink resource, and timing alignment information indicating a relatively small value between two pieces of timing alignment information of the two preambles.

According to another example embodiment, when the terminal is identified as a fixed terminal and it is determined that at least three preambles having the same value as the index are received, the generator 2230 may perform back-off and may initiate a new random access procedure without generating a random access response message.

According to another example embodiment, when the terminal is identified as a mobile terminal and it is determined that a plurality of preambles having the same value as the index is received, the generator 2230 may perform back-off and may initiate a new random access procedure without generating a random access response message.

According to another example embodiment, when it is determined that a single preamble having the same value as the received preamble index is received, the generator 2230 may group a first terminal having transmitted a first preamble and a second terminal having transmitted a second preamble. In detail, the first preamble may represent that a single preamble having the same value as a first index associated with the first preamble is received, and the second preamble may represent that a single preamble having the same value as a second index associated with the second preamble is received.

The generator 2230 may generate the random access response message to assign the same uplink resource to the first terminal associated with the first preamble and the second terminal associated with the second preamble. The generated random access response message may be transmitted to each of the first terminal and the second terminal. For example, a first random access response message transmitted to the first terminal may include a preamble index transmitted from the first terminal, timing alignment information associated with the first terminal, and location information of the shared same uplink resource.

The example embodiments described herein may be implemented using hardware components, software components, and/or a combination thereof. For example, the apparatuses, methods, and constituent elements described in the example embodiments may be implemented using one or more general-purpose or special purpose computers, such as, for example, a processor, a controller, an arithmetic logic unit (ALU), a digital signal processor, a microcomputer, a field programmable array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal comprising a processor and that is to perform a random access procedure with a base station, the terminal comprising:
a processor configured to determine a transmittable message size corresponding to a physical random access channel based on a predetermined communication scheme with the base station;
a calculator configured to set a message to correspond to the message size, and to calculate each of a preamble index and at least one message index from the message; and
an encoder configured to encode each of the preamble index and the at least one message index, and to transmit the same to the base station, wherein the encoder is further configured to generate each of a preamble sequence acquired by cyclic shifting a Zadoff-Chu sequence corresponding to a preamble root index by a constant value corresponding to the preamble index and a message sequence acquired by cyclic shifting a Zadoff-Chu sequence corresponding to each of the at least one message root index by a sum of the constant value corresponding to the preamble index and each of the at least one message index, and to transmit the generated preamble sequence and message sequence to the base station.

2. The terminal of claim 1, wherein the processor is configured to determine the transmittable message size based on a Zadoff-Chu sequence length corresponding to the predetermined communication scheme, a number of preamble sequences, and a number of message root index functions.

3. The terminal of claim 1, wherein the calculator is configured to calculate at least one message root index different from a preamble root index using each of at least one message root index function that uses the preamble index as an independent variable.

4. The terminal of claim 1, wherein the calculator is configured to iteratively extract at least one message bitstream corresponding to each of the at least one message index from a start bit of the set message, and to extract a preamble bitstream from the remaining message.

5. The terminal of claim 1, wherein, when transmitting a message increased to be greater than a Zadoff-Chu sequence length corresponding to the predetermined communication scheme, the processor is configured to transmit the increased message using a plurality of subframes corresponding to the physical random access channel.

6. The terminal of claim 1, further comprising:
a selector configured to select one of a preamble transmission mode and a simultaneous message transmission mode,
wherein when the selector selects the preamble transmission mode, the encoder is configured to encode the preamble index and to transmit the encoded preamble index to the base station.

7. A base station comprising a processor and that is to perform a random access procedure with a terminal, the base station comprising:
the processor comprising a calculator configured to calculate a received preamble index using a sequence received from the terminal and a Zadoff-Chu sequence associated with a preamble;
the processor further configured to determine whether a preamble collision is present using a Zadoff-Chu sequence associated with a message root index that is determined based on the preamble index,
a decoder configured to decode a message transmitted from the terminal through the random access procedure using the preamble index and a message index,
wherein the processor is configured to calculate, when it is determined that the preamble collision is absent, the message index using the received sequence and the Zadoff-Chu sequence associated with the message root index.

8. The base station of claim 7, wherein the processor is configured to calculate a correlation value between the received sequence and the Zadoff-Chu sequence associated with the message root index, and to determine that the preamble collision is present when at least two peaks of the correlation value exceed a preset threshold.

9. A base station comprising a processor and that is to perform a random access procedure with a terminal, the base station comprising:
a calculator configured to calculate a correlation value corresponding to a preamble index and a correlation value corresponding to each of at least one message index using a sequence received from the terminal;
a detector configured to detect each of the preamble index and the at least one message index based on the correlation value corresponding to the preamble index and the correlation value corresponding to each of the at least one message index, and
a decoder configured to decode a message transmitted from the terminal through the random access procedure using the at least one message index and the preamble index,
wherein the decoder is configured to determine, as the operation mode of the terminal, at least one of a first mode for transmitting a subsequent message using a random access resource, a second mode for transmitting the message through a unit frame and terminating the transmission, and a third mode for transmitting the subsequent message through an additional frame.

10. The base station of claim 9, wherein the calculator is configured to calculate at least one message root index that is determined based on the preamble index using at least one message index function, and to calculate the correlation value corresponding to each of the at least one message index using a Zadoff-Chu sequence corresponding to the at least one message root index.

11. The base station of claim 9, wherein the detector is configured to detect each of the at least one message index by comparing a location number corresponding to a peak of the correlation value corresponding to the preamble index to a location number corresponding to a peak of the correlation value corresponding to each of the at least one message index.

12. The base station of claim 9, wherein the decoder is configured to identify a predetermined prefix bit from the decoded message, and to determine an operation mode of the terminal based on the prefix bit.

13. The base station of claim 9, wherein, when the operation mode is the first mode, the decoded message includes a scheduling request that includes resource block size information used to transmit the subsequent message.

14. The base station of claim 9, wherein, when the operation mode is the third mode, the decoder is configured to determine the message as a portion of an entire message transmitted from the terminal and to merge a subsequent message decoded from the additional frame.

* * * * *